Nov. 16, 1965    A. ALVAREZ CALDERÓN    3,218,005
HIGH LIFT SYSTEM FOR HIGH SPEED AIRCRAFT
Filed Dec. 6, 1961    7 Sheets-Sheet 2
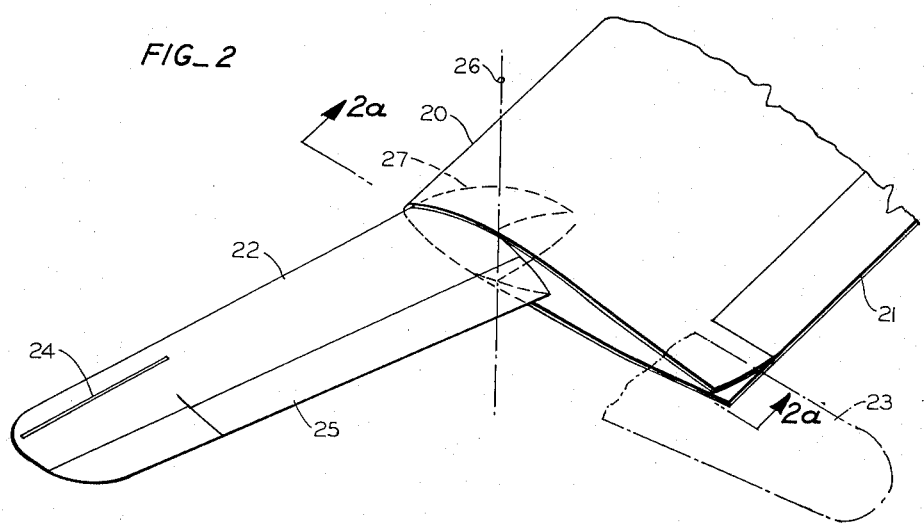
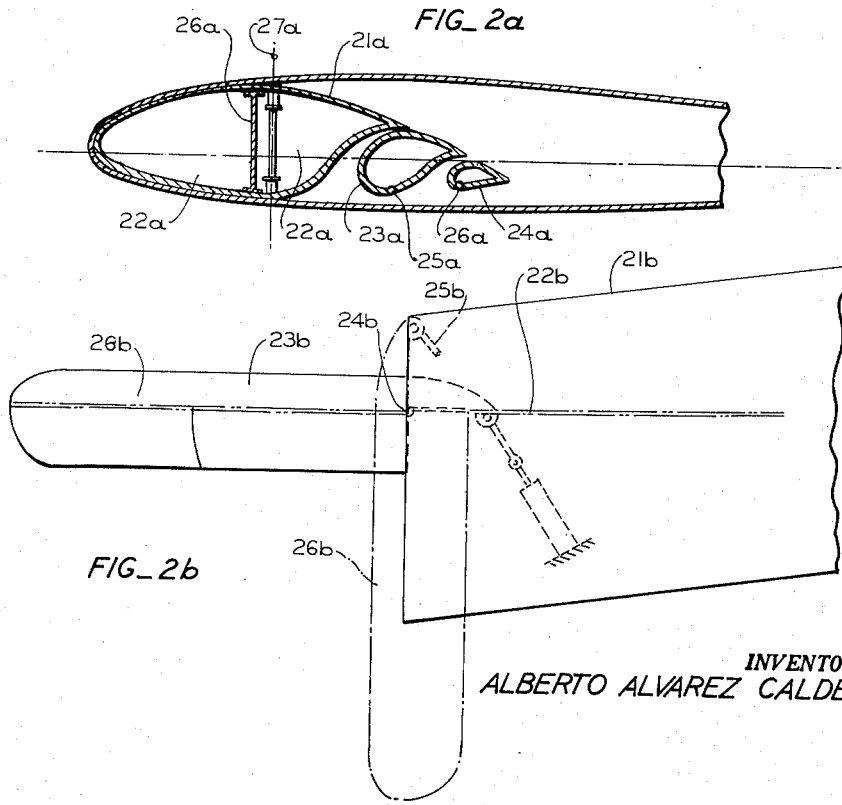
INVENTOR.
ALBERTO ALVAREZ CALDERÓN

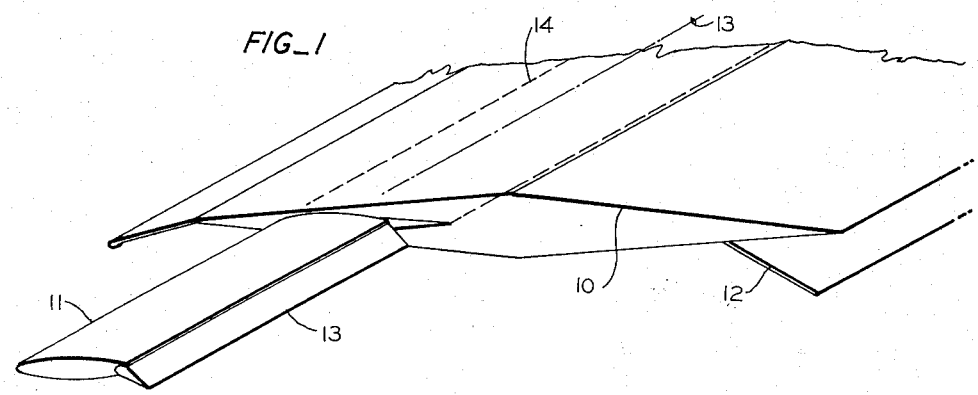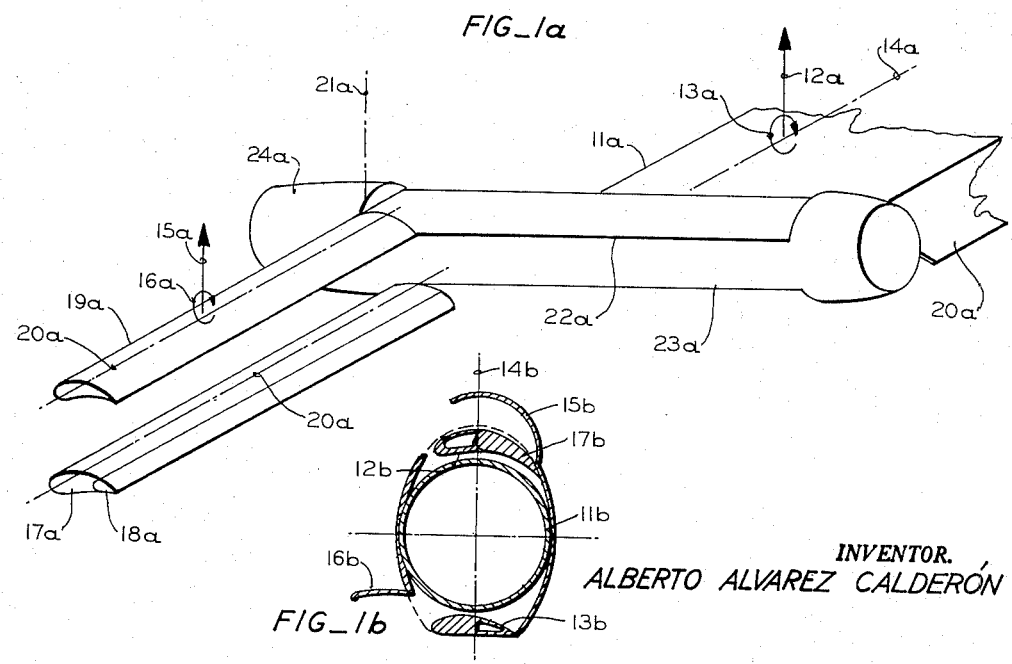

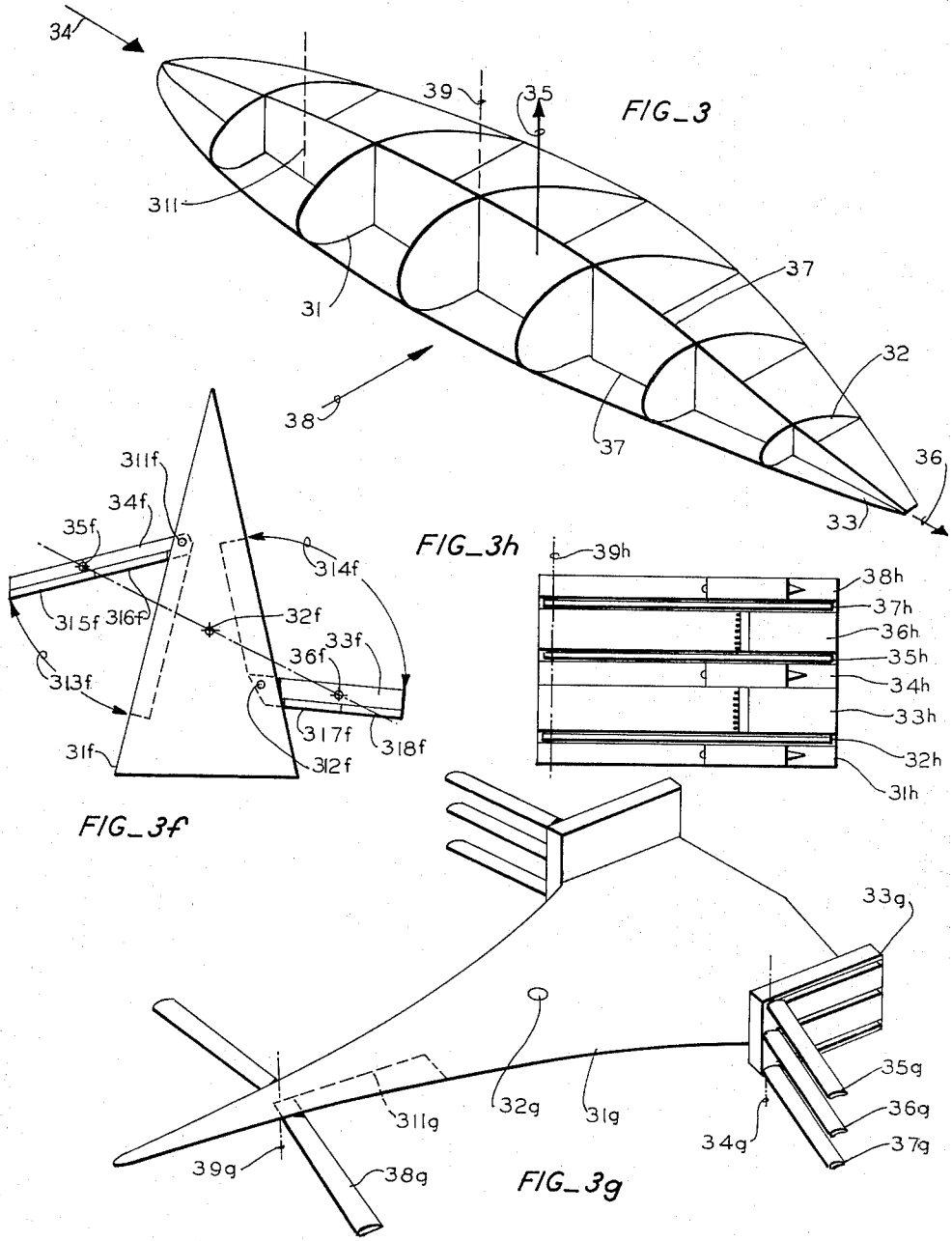

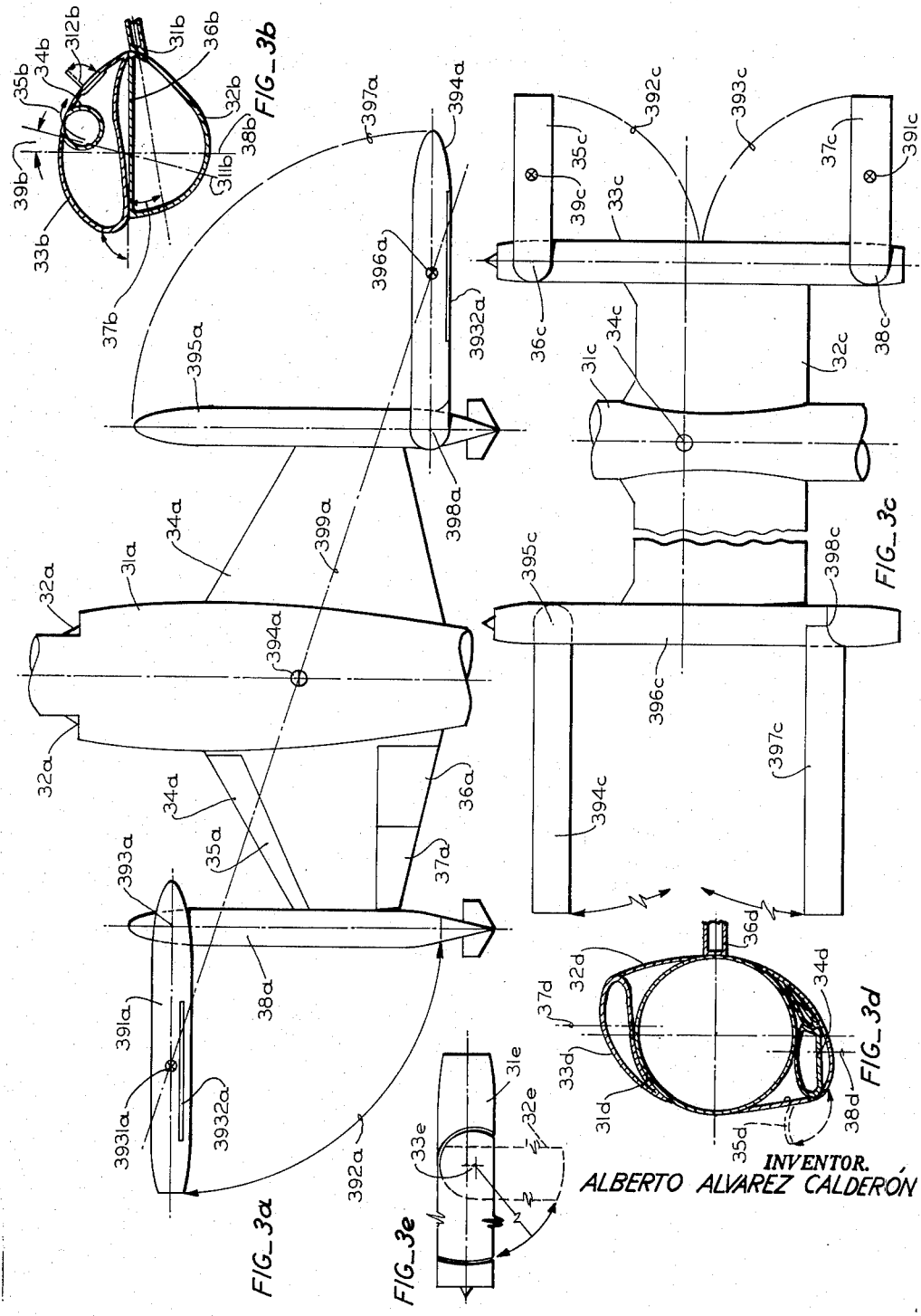

Nov. 16, 1965   A. ALVAREZ CALDERÓN   3,218,005
HIGH LIFT SYSTEM FOR HIGH SPEED AIRCRAFT
Filed Dec. 6, 1961   7 Sheets-Sheet 5
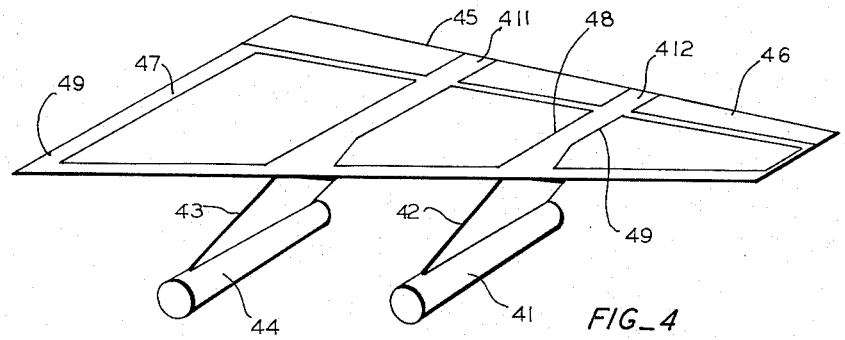
FIG_4
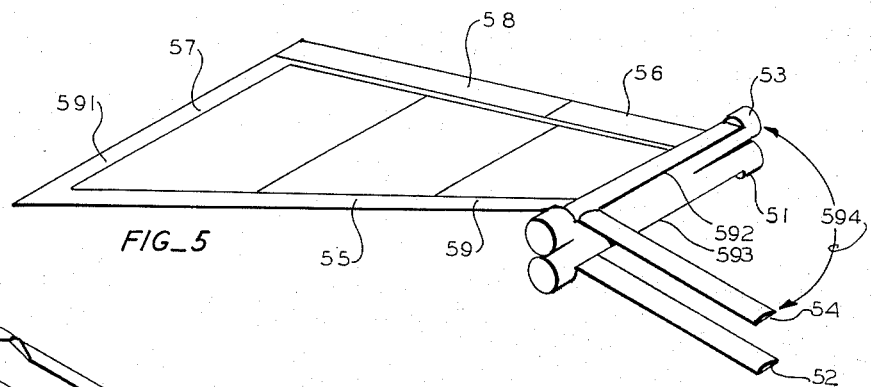
FIG_5
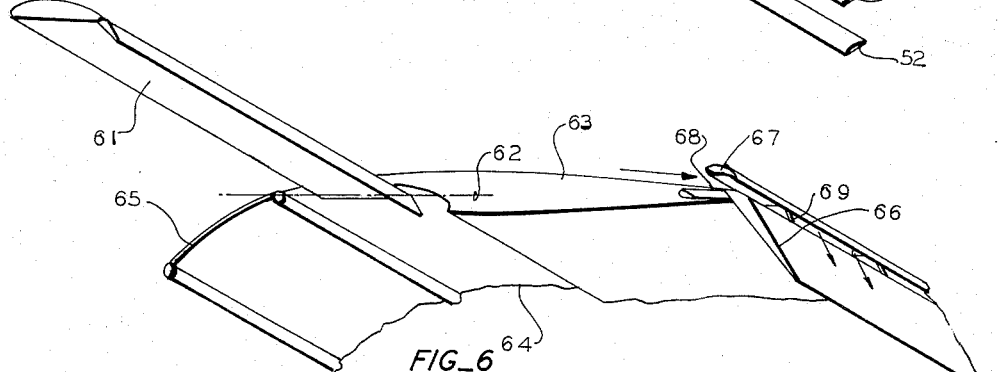
FIG_6
INVENTOR.
ALBERTO ALVAREZ CALDERÓN

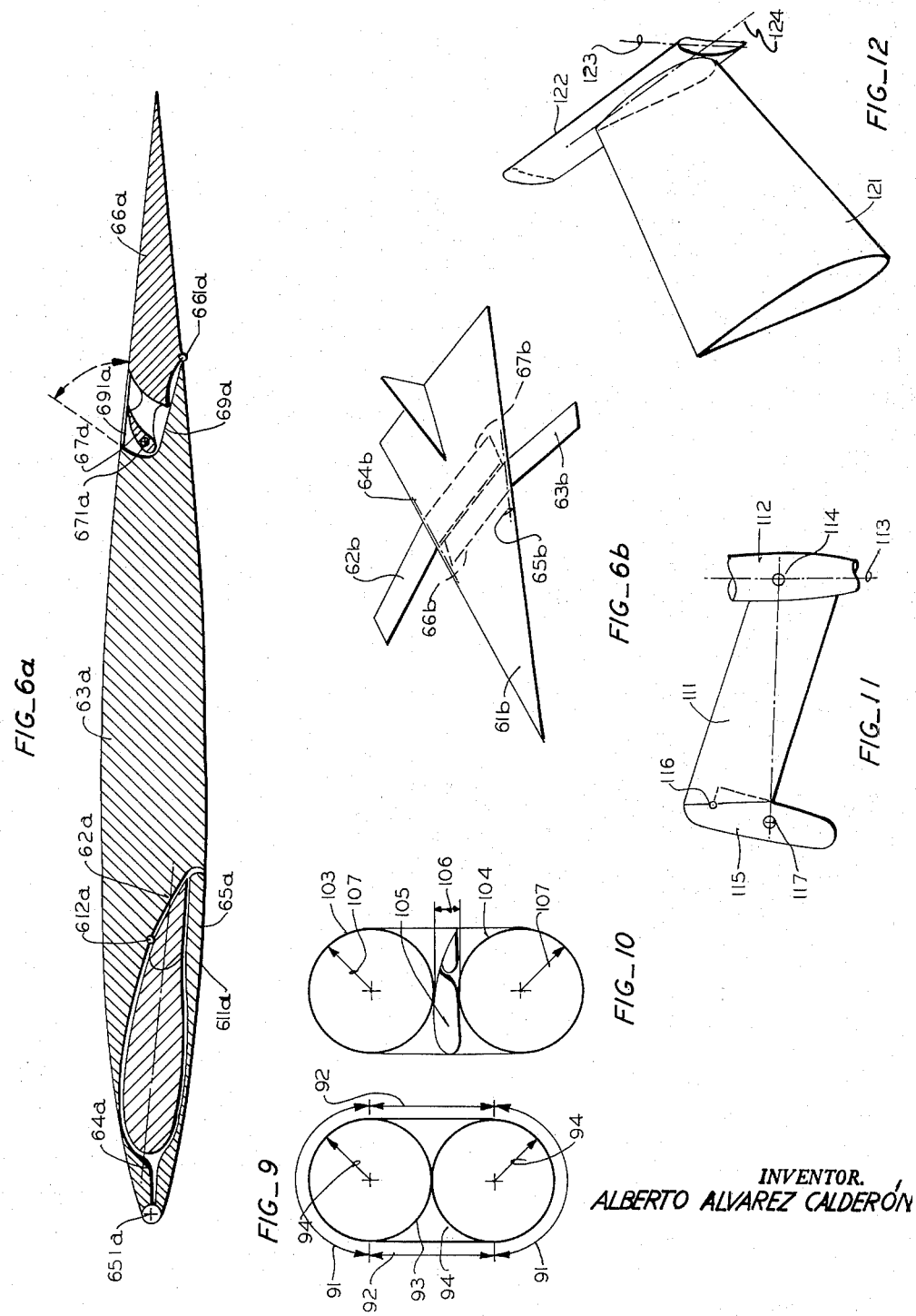

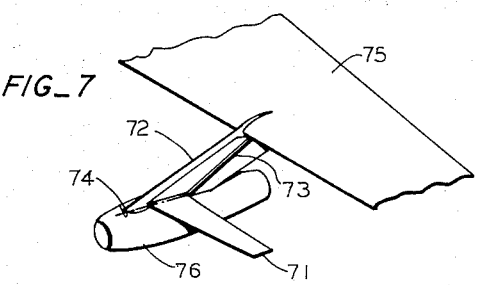
FIG_7
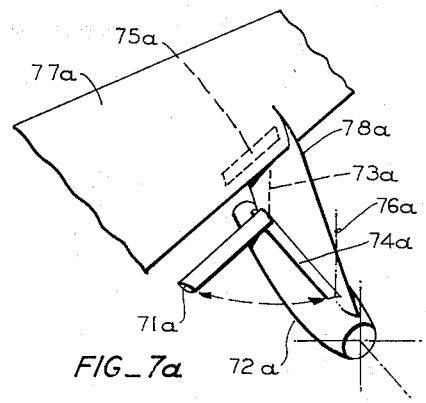
FIG_7a
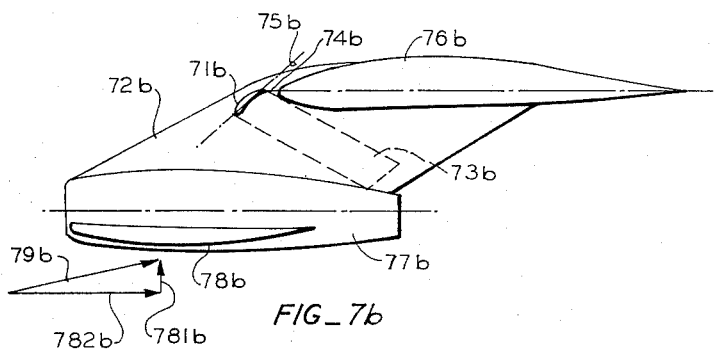
FIG_7b
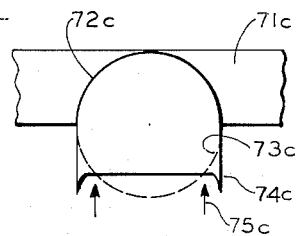
FIG_7c
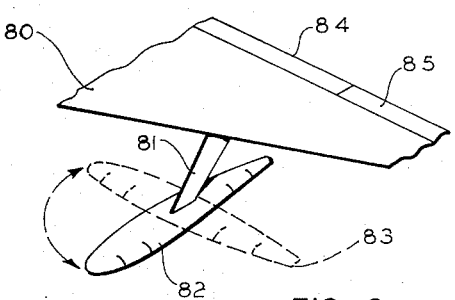
FIG_8
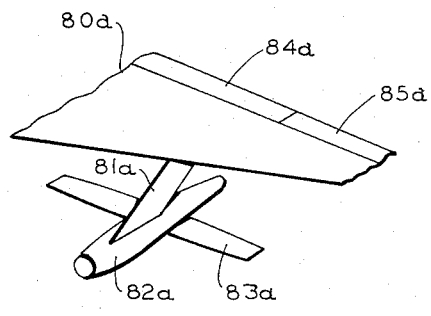
FIG_8a
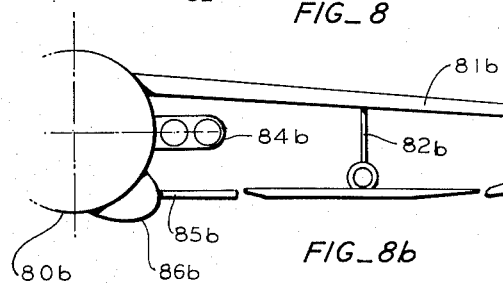
FIG_8b
INVENTOR.
ALBERTO ALVAREZ CALDERÓN No. 3,218,005
Patented Nov. 16, 1965

3,218,005
HIGH LIFT SYSTEM FOR HIGH SPEED AIRCRAFT
Alberto Alvarez Calderon, 1560 Castilleja St., Palo Alto, Calif.
Filed Dec. 6, 1961, Ser. No. 157,419
22 Claims. (Cl. 244—43)

This invention is related to improvements of the aerodynamic and structural characteristics of high speed aircraft and missiles. More particularly, the invention enables to improve the high speed characteristics, the volume storage capacity and the low speed lift and control forces of aircraft capable of operating at very high forward speeds and out of reduced ground distances by means of retractable auxiliary surfaces arranged in combination with other aircraft components like fuel tanks, powerplant nacelles, and pods.

The utilization of gas turbines and ram jets for propelling and for lifting aircraft and flying vehicles has resulted in a significant increase of flying speed, together with increased landing speeds and increased fuel consumption. In order to operate at this high speed economically, low drag aircraft with small or favorable interference drag, thin wings and low frontal area are required. However, the large fuel consumptions of these powerplants result in large volume requirements for fuel storage in the aircraft. This large volume can seldom be accommodated in thin-winged aircraft, especially if large payloads, various installation and long range are desired. The use of thin wings in addition to limiting the volume available for fuel, etc., also increases the landing and take-off speeds because of their poor low-speed aerodynamic characteristics.

As a result of these problems, new airplane configurations and improvements have been developed in recent years which attempt to optimize their high speed characteristics, but yet permit a tolerable low speed behavior. These configurations are limited by penalties and compromises in the low speed characteristics, range and volume capabilities as well as the high speed drag. As an example of a well known recent high-speed configuration which is contrary to normal practice of wing mounted multi-engine propeller airplanes, we have pure-jet multi-engine aircraft of high subsonic and supersonic speeds, which have jet power plants by means of pylons outside and below the wing proper.

The configuration usually has a centrally-located payload carrier which may be a fuselage or its equivalent, thin lifting surfaces usually of swept planform with a degree of sweep depending on intended mach number operation, and a wide variety of pods. Some configurations have powerplants below but away from wings, others have pods mounted on the fuselage or near the tail. Pods and nacelles are also used to hold fuel, equipment, armament and even people. These pods usually consist of long streamlined bodies held to the main airframe at various distances by thin streamlined brackets or "pylons." The pods are designed to house their contents with the most favorable high speed drag arrangement. In the low speed regime, the pods do not contribute significantly to the lift. In fact, in this regime of flight in which the lift available from the thin wings is critical, wing mounted pods penalize lift characteristics substantially (ref NACA RMA58H12). It is pertinent to compare a relatively conservative medium thick subsonic airfoil with a high speed thin airfoil to illustrate the difference of aerodynamic characteristics at slow speeds: A wing section such as the NACA 23012 may develop a maximum section lift coefficient of 1.6 without flaps and 3.3 with good double-slotted Fowler flaps (ref NACA WRL469). A thin low drag section such as 4.2% thick double wedge section develops a maximum section lift coefficient of 0.84 without flaps and 1.73 with trailing edge flaps (ref NACA TN 1934). Even with leading edge flaps added, the double wedge section maximum lift coefficient is only 1.96. It is seen that the wing forces available for lift and control are comparatively poor for thin sections. The lift of high speed jet aircraft wing is further impaired by the absence of the beneficial effects of a propeller slipstream on the wing. In addition, the use of powerful trailing edge devices such as a double-slotted Fowler flap to augment lift of the wing, have the disadvantage of introducing large negative pitching moments on the aircraft. This pitching moment decreases the effective lift increments substantially due to the large negative tail loads needed for trim which subtract from the total lift. This decrease of lift occurs whether the wing section is thin or thick, and may be as large as Change Of $C_L = -.17$ for a typical jet transport with a part span flap (ref NASA TN D103). Since the gains due to the flap are only Change Of $C_L = +0.80$ for this case, it is seen that trim loads are very detrimental. It should be observed that for a full span flap, the penalty to lift gains due to flap pitching moment would be more severe, especially if the sweep is large since in that case the increment of lift in the tip portion of the flapped wing which lies behind the aircraft center of gravity would contribute strongly to the diving movements. The use of sweep further deteriorates the low speed lift characteristics by inducing deleterious spanwise flows and tip stall. It is seen then, that in order to obtain the high speed characteristics imperative for useful and economic operation at that speed range, serious problems are encountered in the low speed high lift and control characteristics which, in fact, set one of the limits of gross weight of the aircraft, and in its fuel equipment and payload volume storage capacity. Obviously it would be extremely beneficial if some structure could be devised to improve aircraft configuration to obtain a benefit of the airplane performance in some, and especially in all, of these three conditions: high speed low drag, low speed lift, drag, control, and increased, or at least no sacrifice of, volume availability to accommodate the necessary payload, fuel and equipment.

The solutions which are now in usage attempt to solve some of these problems independently. For example, further refinement of the trailing and leading edge devices for high lift and control may increase lift for a given wing area, but do not improve volume capacity, nor lift-drag ratio for slow speed climb, and usually require wing surface interruptions. The use of boundary layer control with interior passages and ducting also limit the available volume for storage. Boundary layer control has the disadvantage of requiring that the airfoil operate beyond its normal stall angle. Hence, if the B.L.C. fails, the aircraft stalls.

The use of variable sweep only allows to vary the wing properties as they depend on sweep. The use of spanwise extensions of the wing to increase its area is another possibility to increase lift. It should be mentioned that the variations of the sweep and spanwise extension of the aircraft's wings are such complicated features that no production aircraft incorporates them at present.

In the case of the variable sweep, some of these complications are associated with the change of the center of gravity and aerodynamic characteristics with sweep angle and also with the structural problems associated with supporting large loads of the type developed by the aircraft's total weight by two articulations. Variable area wings in the chordwise direction are the well-known Fowler flap, and the slat. The translation of Fowler flap is a complicated problem. Variable area by telescoping wing panels in spanwise direction presents a structural problem, in that one of the surfaces which translates towards the other has to be hollow and empty. Evidently, it is urgently needed to have improved structures by which the use of variable geometry will allow a prescribed variation of airplane characteristics, including a related change of center of gravity and aerodynamic characteristics such as to provide a minimum pitch disturbance and large lift increments, and also provide increased volume storage. The structural complications of the associated structures and mechanisms acting under their loads should be simplified to an operational level.

In my co-pending patent application Serial #29,656 of May 17, 1960 and application Serial #48,038 of August 8, 1960, I have specified aerodynamic systems, arrangements and structures for improved lift and control by use of force producing cylinders in trailing edge devices of wings, and described their application for vertical take-off aircraft and short take-off aircraft. Also I have included different uses of retractable force producing cylinders in combination with aircraft in various arrangements. The force producing cylinders are bodies capable of developing high lift coefficients when compared to lift coefficients available from normal wings, and/or capable of producing strong local effects in the airflow in their vicinity. These force producing cylinders were described to be not necessarily circular cylinders but of any shape capable of producing relatively large aerodynamic forces. Some of the force producing cylinders are surfaces of some medium aspect ratio which have an operative position immersed in the relative airstream at low speeds to produce lift and control improvements, and are retracted to non-interfering inoperative disposition at high speeds for low drag of the aircraft utilizing them.

In this application I am disclosing the structures and methods of operation of generally cylindrical auxiliary retractable lift and control surfaces in various combinations with aircraft and aircraft components. I am showing new and ingenious methods in which I use airfoil-shaped auxiliary retractable surfaces with and without boundary layer control to provide functions of slow speed lift increments and control improvements, and increased volume storage capacity, structural simplifications and high speed drag reduction, shown to be desirable for improved performance of aircraft. Although the auxiliary lifting bodies shown in this application are not suction, blowing or rotating cylinders, it is understood that such bodies could also be used in the arrangements, methods of retraction and extension, and configurations shown in this invention, to perform the functions of the auxiliary surfaces shown therein. With the introduction of appropriate force coefficients, the theoretical calculations shown herein are also applicable in principle to the rotating, suction or blowing cylinders, of my aforementioned applications.

It is a general object of the present invention to improve the lift, drag and control characteristics of the aircraft.

Additionally, it is a feature of the invention to enable the design of high speed low drag aircraft that have improved low speed lift, drag and control characteristics and improved fuel and payload capacity.

It is a further object of the invention to enable the design, for aircraft which fly at speeds in which the effects of air compressability is noticeable, of high lift drag ratio configurations which yet have improved low speed characteristics.

It is yet another object of this invention to combine various aircraft components of different functions into compact and efficient low drag units; for instance, power plant and variable geometry or variable geometry and fuel storage, or all of these in one structure.

One more feature of this invention is the variation of the orientation of aircraft components and appendices to obtain various desired characteristics according to the speed of flight.

Yet another feature of this invention is the achievement of lift increments by means of structures associated with the wing, which also can minimize the lift penalties and pitching moments associated with a trailing edge high lift device.

One more feature of this invention is the use of external fuel containers of variable position and orientation to strongly influence the aerodynamic characteristics and performance of the aircraft.

These, as well as other objects and features of my invention will become more apparent from a perusal of the following description of the various embodiments illustrated in the accompanying drawings wherein:

FIGURE 1 shows an auxiliary high lift surface mounted for telescopic projection and retraction on a thin wing suitable for supersonic flight.

FIGURE 1a shows a biplane arrangement of auxiliary lifting surfaces in combination with a tip mounted nacelle which provides an increase of lift and other improvements.

FIGURE 1b shows a generalized cross-section of a structure of the type of FIGURE 1a with the auxiliary lifting surfaces in the retracted position.

FIGURE 2 shows an isometric view of a lifting tip mounted fuel tank which can swing from the high lift position shown, to a retracted disposition aligned with the airflow.

FIGURE 2a shows an alternative form for the structure of FIGURE 2, being a sectional view taken along the plane 2a—2a of FIGURE 2.

FIGURE 2b shows in plan view a variation of a lifting fuel tank of the type shown in FIGURE 2.

FIGURE 3 shows the geometric shape of a generalized lifting fuel tank to be used in connection with an aircraft to improve its over-all performance.

FIGURE 3a shows the use of a splitting tip mounted high-lift tank incorporated into a supersonic fighter.

FIGURE 3b shows a cross-sectional view of a splitting high lift tank.

FIGURE 3c shows two distinct uses of auxiliary lift surfaces in combination with a tip mounted nacelle.

FIGURE 3d shows a cross-sectional view of a biplane arrangement of high lift surfaces in the retracted position.

FIGURE 3e is a view showing details of retraction of FIGURE 3c.

FIGURE 3f shows a peculiar use of variable area and variable sweep on a delta wing aircraft to optimize its structural and stability characteristics as well as its high lift and control.

FIGURE 3g shows a preferred embodiment of auxiliary lifting multiplanes in combination with power plant groups on a delta aircraft.

FIGURE 3h shows a side view of a powerplant high lift surfaces combination for delta aircraft.

FIGURE 4 shows by way of illustration a typical prior art wing-fuel tank powerplant arrangement for high speed jet aircraft.

FIGURE 5 shows a preferred and improved arrangement for a multi-jet high speed aircraft having auxiliary lifting surfaces.

FIGURES 6 and 6a show a novel and structurally efficient method to vary the span and area of aircraft by means of foldable auxiliary surfaces.

FIGURE 6b shows an application of a structure of the types of FIGURE 6a to a delta wing aircraft.

FIGURES 7, 7a and 7b show novel ways to improve the airflow conditions on wings which have nacelles supported by pylons, by means of retractable auxiliary surfaces mounted on the nacelle or the pylons.

FIGURE 7c shows an improved high lift cross-section for a wing mounted nacelle.

FIGURE 8 shows an advantageous use of an external fuel tank to improve lift and control forces of the aircraft supporting it, the tank having the shape shown in greater detail in FIGURE 3.

FIGURE 8a shows the use of an auxiliary surface in combination with a pylon-mounted nacelle.

FIGURE 8b shows a partial front view of an aircraft which utilizes the structures of FIGURES 8 and 8a.

FIGURE 9 shows by way of comparison, a cross-view of a standard nacelle housing two jet powerplants.

FIGURE 10 shows a preferred cross-section of a nacelle housing two jet powerplants as well as an auxiliary lifting surface in the retracted position.

FIGURE 11 shows in a planform view a structure of the general type described in connection with FIGURE 2. In FIGURE 11 however, the wing may be regarded, with the fuselage, as a swept forward wing, in which case the auxiliary surface is pivoted at the wing leading edge, or as a swept back wing, in which case the auxiliary surface can be regarded as pivoted near the trailing edge of the wing.

FIGURE 12 shows in isometric view a different arrangement of a retracted auxiliary lifting fuel tank in which the tank, which is shown in the retracted position, can be extended by rotating it about two axes in order to locate it to its high lift position.

With initial reference to FIGURE 1, there is shown a structurally advantageous method of increasing the effective span and aerodynamic load carrying capacity of a wing by means of an associated high lift wing tip extension which in its retracted high speed position is housed within the wing, and emerges telescopically from the retracted position into a high lift extended position beyond the main fixed wing portion for slow speed flight. In the past, telescopic means to vary the wing span have been proposed using substantially full chord wing extension panels. Such methods however, are extremely complicated structurally, and all that is obtained is an effective increase of span, area and lift carrying capacity, proportional to the amount of projection of the auxiliary surfaces. Using a narrow chord on the telescopic portions obviously simplifies the structural problem considerably, and is desirable if the same aerdoynamic gain as in full chord extension is retained. It is possible to extend the lift carrying capacity of the main wing in proportion to the amount of projection of a small-chord auxiliary surface if the latter's section maximum lift coefficient is substantially higher than that of the fixed wing portion. In fact, if the product of the section lift coefficient times the chord of the auxiliary surface is equal to the product of the section lift coefficient times the chord of the main wing, then the spanwise projection of the small chord auxiliary surface produces the aerodynamic effect of a spanwise projection of an auxiliary surface having substantially the same wing chord as that of the main wing, without the structural disadvantages of the latter.

In FIGURE 1a I show main wing 10 which has a low drag profile for supersonic speeds and a section maximum lift coefficient which is relatively low, of the order of 1.5. At its wing tip there is shown a surface 11 which should preferably have subsonic airfoil section profile having a high lift maximum lift coefficient of approximately 6 by means of blowing or suction boundary layer control. In this example, the chord of the auxiliary lifting surface should be approximately one fourth of the chord of the main wing, and its maximum thickness should preferably be slightly less than the maximum thickness of the fixed wing airfoil. For instance, if the fixed wing thickness is 5% of the wing chord, the auxiliary surface thickness should be at least of about 12% thickness, but preferably of 18% thickness. Since the maximum lift contributions of chordwise elements of the wing depend upon the product of the section maximum lift coefficient of the profile times its wing chord, it is evident that the lift contributions of the fixed wing portions, which are proportional to 1.5 times the chord, are approximately equal to the lift contributions of the small-chord high-lift-coefficient auxiliary surfaces, which are proportional to six times one fourth of the chord, or 1.5 times the chord. Hence, the lift of the main wing has varied in proportion to its increment of span by the use of small chord extension panels. The chordwise location of the extended auxiliary surface will depend upon the type of aircraft using it. Generally speaking, a forward location is favorable to produce positive pitching moments and decrease pitch stability, and a rearward location in a chordwise position behind the C.G. is desirable to increase pitch stability. These factors will be explained later in more detail with reference to other similar figures.

As shown in FIGURE 1, the aerodynamic axis of the auxiliary surface in close vicinity to the aerodynamic axis of the wing, but preferably ahead of the center of gravity of the airplane. There is also shown in FIGURE 1 a trailing edge device 13 on auxiliary lifting surface 11 to supply roll control forces to the airplane. This would permit the use of the entire trailing edge portion of the fixed wing part to install a high lift trailing edge device shown in this instance by split flap 12. In the retracted high speed position, the auxiliary surface retracts to dash-line position 14. In order not to penalize fuel volume storage capacity, surface 11 may be used as a fuel tank. It should be observed in connection with the structure of FIGURE 1, as well as in reference to future structures, that the lift increments on the combinations shown, are not only the lift increment by the load carried by the auxiliary surface itself, but include:

(a) Lift increment due to the reduction of wing tip lift losses by favorable inter-action of pressure fields of surfaces 10 and 11, and due to a spanwise re-distribution of induced angles of attack.

(b) Lift increments due to the use of full span trailing edge flap 12 for wing 10 with roll provided by varying force on surface 11, if desired.

(c) Lift increments due to reduction of negative tail loads which result from a decrease of negative pitching moments due to flap 12, by placing the resultant force of the surface 11 acting ahead of the axis of moment 13. This location provides a pitch-up moment to counter-act the negative flap moment.

(d) By increasing the effective wing span of wing 10 by the addition of tip extension 11, the induced drag is decreased to improve L/D ratio for climb and take-off.

(e) Horizontal tail control forces and elevator area may be decreased by modifying wing pitching moments as will be explained later. It is thus seen that the benefits of combing surface 10 and 11 in the prescribed manner are very significant, in addition to the substantial net lift gain equal to the lift force of surfaces 11 and 12. A numerical evaluation of the advantages and benefits of structures like FIGURE 1 is shown as a corollary to the more rigorous calculation on the structure of FIGURE 1a.

We now consider the structure of FIGURE 1a, which shows a "biplane" set of auxiliary surfaces in combination with a jet powerplant mounted at the tip of a fixed wing. Specifically, there is shown fixed wing 11a having a quarter chord aerodynamic axis 14a and trailing edge flap 20a, supporting at its tip a streamlined nacelle 24a which may contain within it a jet engine or an auxiliary tip fuel tank. Supported to nacelle 24a by a generally vertical pivotal hinge axis 21a at the forward extremity of nacelle 24a, there are shown two auxiliary lifting surfaces 19a and 20a forming the upper and lower components of a biplane auxiliary lifting element projecting beyond and ahead of the main surfaces in the extended position. Also shown are the quarter chord aerodynamic axis 20a of auxiliary lifting surfaces, a trailing edge flap on surface 17a to provide roll control, and nacelle recessions 22a and 23a to receive the auxiliary lifting surfaces into a retracted high speed position wherein the long dimensions of said surfaces are parallel to the long dimensions of the nacelle. In the retracted position (not shown), upper surface 19a forms the upper surface of the nacelle itself in smooth continuation of the latter's forward and rear ends beyond the retracted surface position. The lower surface, in the retracted position, may be covered by a special nacelle door, of a general type to be described in an alternate form of this embodiment in FIGURE 1b. Additionally, the drawing shows load vectors 12a and 13a indicating respectively lift force and pitching moments on any auxiliary surface.

One advantage of the structure of FIGURE 1a is that it permits independence of chordwise location and thickness of the main wing. This is possible because there is no mutual retraction geometric requirement between auxiliary wing and main wing. Therefore a thicker tip surface section may be used for higher lift and volume storage, and in this example it has been placed ahead of leading edge of wing. Also the utilization of tip nacelle allows two extendable tip surfaces for high lift per wing tip with a low drag retraction arrangement, since the total external surface of two retracted auxiliary surfaces plus nacelles is not much larger than that of the nacelles alone, and the frontal areas would be very similar.

Another advantage of FIGURE 1a is a favorable interaction on the lower flap's upper surface flow by the flow from the upper wing lower surface, to improve the overall lift efficiency of the auxiliary lifting biplane. The biplane arrangement also reduces the induced drag due to lift. Additionally, since the total lift increment is large (as will be shown), but is distributed to a large number of articulations, I have here a means to simplify each articulation by reducing its load.

I evaluate the aerodynamic characteristics of structure of FIGURE 1a by way of example, but not of limitation. In order to give full scale usefulness to these computations, high Reynolds number NACA tunnel data will be used for the basic components of the combination. Consider the maximum lift coefficient $C_{Lmax}$ and pitching moments coefficient $C_{mc}/4$ at maximum lift of the structure of FIGURE 1a. Let the basic wing 11a have the following characteristics (ref NACA RM L8D30, data at Reynolds number about 4,000,000)

Basic air foil section NACA 2 S–(50)(05)–(50)(05)
Aspect ratio 3.4

In the absence of retractable tip surfaces, the coefficients of the basic wing are available from the above source.

$C_{Lmax}$ No Flaps=0.58
$C_{Lmax}$ Half Span Split Flaps=1.00
$C_{mc}/4$ Half Span Split Flaps=−0.15
Change of $C_L$ due to Part Span Flaps=+0.42
$C_{Lmax}$ Full Span Split Flaps=1.24
$C_{mc}/4$ Full Span Split Flaps=−0.29
Change of $C_L$ due to Full Span Flaps=0.66

Evidently, with roll control supplied by normal, half span ailerons the maximum lift coefficient of the basic wing is 1.00 with half span flaps in the remainder portion of the trailing edge. The loss of maximum lift coefficient with negative tail loads required to trim negative pitching moment due to flap may be calculated assuming a tail length of twice the wing mean aerodynamic chord with the aid of the formula given in NACA WRL–469

$$\text{Change of } C_{Lmax} = \frac{C_{mc}/4 @ C_{Lmax.}}{\text{Tail Length}} = \frac{-0.15}{2} = 0.075 \quad \text{(I)}$$

With this assumption the maximum lift coefficient $(C_{Lmax})a/p$ of the basic wing in an aircraft would be:

$C_{Lmax}a/p = (C_{Lmax})$ wing with Half Span Flaps+Change of ($C_{Lmax}$) due to trim for pitching moment of flaps
=1.00−0.075
=0.925     (II)

In order to compare the effect of loads on the four tip extensions shown in FIGURE 1a as 18a and 19a, I calculate their aerodynamic characteristics individually and add them to the characteristics of the basic wing in combination with the tip surfaces. It is assumed that each of the tip surfaces is capable of developing a tip surface lift coefficient $C_{Lt}$ of 3.15 based on its own area. For purposes of illustration, FIGURE 1a shows tip surface 19a with a lifting force vector 15a acting through its own quarter chord axis 20a and a tip surface pitching moment couple which is represented by 16a. The magnitude of the pitching moment coefficient for each tip surface may be assumed as $$\frac{C_{mct}}{4} = -0.70$$

where $C_t$ refers to the tip surface chord. Both values of $C_{Lt}$ and $$\frac{C_{mct}}{4}$$

have been derived from typical high lift section data which shows $C_{Lmax}$=3.5 possible on the NACA 23012 (ref NACA WRL269). Naturally other types of airfoil sections could be used. We prescribe the following dimensions for each tip surface, in terms of wing chord C Tip surface span=C (span equal to main wing chord)
Tip surface chord=C/4
Tip surface area=$C^2/4$ each
Total surface area=$C^2$
Maximum lift coefficient=$C_{Ltmax}$
    =3.15 (based on own area)
Pitching Moment $C_{Ltmax} = \frac{C_{mct}}{4}$ =−0.70 (based on own area)

For this example we assume that the tip sufaces are mounted in top and bottom of tip mounted nacelles which may have fuel or powerplants or equipment. In the retracted position (not shown) the four tip surfaces would be aligned with the tip nacelles for minimum high speed drag. As shown in the extended position we show the quarter chord lines 20a of the tip surfaces of a left wing ahead of wing quarter chord line 14a, said quarter chord lines aligned with the leading edge of the main wing.

In this figure, tip surface trailing edge flaps provide roll control for combination. For example, on surface 17a there is shown a trailing edge flap 18a which not only allows high lift for surface 17a, but also acts as an aileron to provide suitable variation of tip surface forces on one wing tip alone, or related variations of tip surface forces on opposite ends of the wing (not shown) whereby rolling couples can be introduced to the airplane. Thus, in the low speed condition, the entire trailing edge of main wing 11a can be used for a trailing flap 20a. For high speed condition, part of 20a may be used as a normal aileron.

In order to be able to evaluate the effect of the combination, it will be useful to evaluate the resulting forces in terms of aerodynamic coefficients referred to the basic wing chord C, and compare it to the basic unmodified wing. The total tip-surface lift loads $L_t$ act on four auxiliary tip surfaces, and are calculated by well-known aerodynamic formulas $L_t = C_{Lt}qS_t$ with $C_{Lt}$ = Lift coefficient for auxiliary surfaces (III)
$S_t$ = sum of tip surfaces' area and
$q$ = dynamic pressure
$= 3.15qC^2$ (based on areas expressed in terms of wing chord C and acting at the surfaces' own quarter chord line)

A lift force vector is shown as vector 15a in one surface 19a by way of illustration.

The pitching couple on the tip surfaces is shown by arrow 16a in one of the surfaces; for all of the surfaces it is equal to $M_t$:

$$M_t = C_m \frac{C_t}{4} q S_t C_t \text{ with } C_t = \text{tip surface chord}$$

$$= -0.70 q C^2 \frac{C}{4}$$

$$= -0.175 q C^3 \text{ (based on areas expressed in terms of wing chord C)}$$

The main wing loads are lift force vector 12a and pitching couple 13a:

Lift force $= C_L q S = 1.24 \, a \, 3.4 C^2$ with Full Span Flaps
$= 4.21 q C^2$ Pitching moment $= C_M \frac{c}{4} qSC = -0.29 q 3.4 C^3 = -0.985 q C^3$ We calculate the effect of the tip surfaces on the main wing load by transferring their loads to the main wing. Translating the tip surface lift forces introduces, of course, a positive pitching moment. We evaluate also the aerodynamic inter-action of the surfaces. We may write, letting subscript $a/p$ = airplane:

$C_{La/p} = C_L$ wing with combination tip surfaces
  $+$ Change of $C_L$ trim loads due to high lift devices This expression in its components becomes:

$C_{La/p} = C_L$ wing full span flaps + Change of $C_L$ due to lift on tip surfaces + Change of $C_L$ trim loads due to high lift devices + Change of $C_L$ = aerodynamic inter-action of tip surfaces (VII)

We have already evaluated first term of right hand side of equation at $421qC^2$ in Equation V. We evaluate the next term based on basic wing areas with the aid of Equation III:

Change of $C_L$ due to lift on tip surfaces
$$= \frac{\text{Change of Lift}}{qSC} = \frac{3.159C^2}{3.4C^2} = 0.926 \quad \text{(VIII)}$$

To evaluate Change of $C_L$ of aerodynamic inter-action of tip surfaces, we must consider the phenomena determining the maximum lift of the main wing in the absence of tip surfaces, and consider how tip surfaces modify the phenomena to increase the lift. The maximum lift for such a wing is determined by center section wing stall when the effective center section local angle of attack is equal to its stalling section angle of attack. The spanwise distribution of induced angle of attack, which is one of the components of effective angle of attack, is large at the center section if the wing plan form is rectangular and this in turn so distributes the lift on the wing as to promote a large center section induced angle of attack. Varying the spanwise lift distribution, for instance by tapering the wing, decreases the induced angle of attack at the center section, and allows—prior to the stall—a spanwise extension of the highly loaded center section lift distribution, and thereby increases the over-all lift.

In this case, the tip extension, because they act against the formation of wing tip vortexes and because they change and extend the spanwise lift distribution of the combination, do decrease the center section induced angle of attack to allow a higher lift. The increment of lift coefficient due to this inter-action is evaluated at 3% (or higher) of the same wing's maximum lift coefficient without tip surfaces. Thus, the Change of $C_L$ inter-action
$= .03(1.24) = .0372 = 0.37$ (VIIIa)

The effect of the tail loads for trim on the change of $C_{Lmax}$ requires an evaluation of pitching moments of combination about the quater chord or wing.

The basic expression for the pitching moment may be written as:

$$C_m \frac{c}{4} = C_m \frac{c}{4} \text{ wing} + \text{Change of } C_m \frac{c}{4} \text{ due to lift forces on tip extensions}$$
$$+ \text{Change of } C_m \frac{c}{4} \text{ due to moments on tip extensions} \quad (IX)$$

We evaluate the second and third terms of the right hand side:

Change of $C_m \frac{c}{4}$ due to lift forces on tip $$\text{extensions} = \frac{\text{Change of } M}{qSC} = \frac{L_t \text{ (arm)}}{qSC} \quad (X)$$

Arm is $C/4$ by definition and $L_t = 3.15qC^2$, thence:

Change of $C_m \frac{c}{4}$ due to lift forces on tip $$\text{extensions} = \frac{3.15 C^2 C/4}{3.4 C^3} = +0.232 \quad (XI)$$

and Change of $C_m \frac{c}{4}$ due to moments on tip extensions $$= \frac{\text{Change of } M}{qSC} = \frac{-0.175 q C^3}{q 3.4 C^3} = -0.0515 \quad (XII)$$

Therefore, with $-0.29$ being the basic wing pitching moment coefficient we write:

$$C_m \frac{c}{4} a/p = -0.290 + 0.232 - 0.052 = C_m \frac{c}{4} a/p = -0.110 \quad (XIII)$$

Assuming a tail length of 2C we have then:

Change of $C_L$ due to trim loads high $$\text{lift devices} = \frac{-0.110}{2} = -0.055 \quad (XIV)$$

We can now calculate the maximum lift coefficient ($C_L a/p$) of an aircraft wing using the structure of FIGURE 1a, by adding the components calculated, as in Equation VII:

$C_L a/p$ combination $= 1.240$ (wing) $+ 0.936$ (tip lift)
  $+ 0.37$ (inter-action) $- 0.055$ (trim)

$C_L a/p = 2.148$ (XV)

We compare the basic wing with part-span flap with the wing-tip surface combination shown in FIGURE 1a. Wing part-span flap: $C_L a/p$ Max $= 0.95$. Percent of increment of lift due to high lift devices lost, to trim for high lift devices=

$$\frac{-0.075}{0.42} = -17.9\%$$

In contrast we have, for the wing of FIGURE 1a, $$C_{Lmax}a/p = 2.148$$

and percent of increment of lift due to high lift devices lost, to trim for high lift devices=

$$\frac{-.055}{(2.203 - 0.58)} = -3.39\%$$

We conclude that for the configuration of FIGURE 1a, the lift of the basic wing can be approximately doubled and the loss of lift increment of flaps due to trim loads can be decreased very substantially.

These calculations have been based on selection of four tip surfaces, each of which can develop a section maximum lift coefficient of 3.5. Evidently, a configuration as in FIGURE 1, using one tip extension per wing could also be employed advantageously, because its higher section lift coefficient of 6 makes up for the decrease of area. Even in the case of a configuration as in FIGURE 1, but with a section maximum lift coefficient of 3.5, the increment of lift due to tip surface lift forces would be still substantial, and about equal to:

$$\frac{1}{2}(0.926) = 0.463 \qquad (XVa)$$

(See Equation VIII, reduction due to reducing number of tip surfaces by one-half.) Full span flaps could still be used, the favorable inter-action of the wing and surfaces would be beneficial, and the trim lift losses can be adjusted to the minimum by proper location of tip surfaces sufficiently ahead of the wing quarter chord, for instance by sweeping the tip surface forward. For instance, in the latter case, the wing lift could be estimated as about:

$C_L a/p = C_L$ wing full span flaps+Change of $C_L$
due to tip surface=1.240+0.463=1.703 (XVI)

which is substantially greater than $C_L$ wing=1.00 with part-span flaps. A final quantitative example with reference to these calculations is the use of two tip surfaces in combination with a part span split flap (for instance, the configuration of FIGURE 2b). For a wing with the characteristics assumed for FIGURE 1a, and with the aid of Equation XVa, we have a maximum lift coefficient of about 1.00+0.46=1.46, which is still a substantial improvement over the basic wing with part span split flaps.

It should be observed that reference has been made to the quarter chord moment axis location for simple use of aerodynamic data. Actually, it could be referred to any convenient location, such as the center of gravity of the airplane.

The significance of these increments of lift coefficient is not only in reference to minimum landing speeds, which vary as the square root of the inverse of the maximum lift coefficient, as given by the formula $$V_{min} = \text{the square root of } \frac{2w}{C_L qS}$$

where $W$=weight, $q$=density and $S$=area and $C_{L\ max.}$=maximum lift coefficient but in reference to the ground distances which, as an approximation, varies in proportion to the square of the take-off speed.

With reference to drag of the configuration, it should be observed that in the retracted position, the increment of frontal area and envelope surface of the tip surface powerplant combination is very small. It is also possible to utilize part or all of the lift gains of tip surfaces for reduction of main wing area. As an example of this possibility, if one prescribes that the structure of FIGURE 1a should have a lifting ability of 1.2 times that of the basic wing with part-span flaps we have, with subscript $m$ referring to FIGURE 1a structure in which the area of the wing is modified, and with L denoting lift and S denoting area:

$$\frac{L_m}{L \text{ part span flap}} = 1.2 = \frac{C_{Lm} q S_m}{C_L q S} = 1.2 =$$

$$\frac{2.148 S_m}{0.9255 S} \text{ (see equation XV and basic wing description)}$$

Whence $$\frac{S_m}{S} = \frac{1.2(0.925)}{2.14} = .518$$

Thus it is seen that with the prescribed relation of lift, it is possible to greatly decrease wing area, thereby reducing substantially the drag of the wing combination at high speeds, even with the small increment of drag due to tip surfaces, which would then be retracted.

With reference to volume storage capacity, the volume of the combination of FIGURE 1a is increased in proportion to the depth and span of the tip surfaces. Thence a relatively thick tip airfoil should preferably be chosen which will also aid the high lift function. Yet, by virtue of its change of orientation to a position aligned with the flow and combined with the tip nacelle, little drag increment will result, as will be more fully explained later.

FIGURE 1b shows a cross-sectional view of a tip nacelle—high lift surfaces combination of the type of FIGURE 1a, but also illustrative of subsequent structures as will be mentioned later. The combination is shown housing within its skin two lifting tip surfaces in the retracted position for high speed flight. Specifically, there is shown an inner nacelle cross-section 11b which can, for example, be a fuel tank, a jet engine, a ram engine or an armament container. There is shown in the retracted position around inner cross-section 11b, high lift surfaces 12b and 13b immediately adjacent to the outer surfaces of the nacelle. The inner nacelle—retracted lifting surfaces combination is shown having an external envelope or skin consisting partly of surfaces of inner section 11a and partly of special retracted-wing fairings, having special doors to permit movement of retracted surfaces about a generally vertical axis 14b at the forward end of the nacelles. To emerge to high lift position, the tip surfaces pivot about vertical axis 14b outward to the left. Enclosing doors 15b and 16b open to allow the emergence of the surfaces. Surface 12b must raise its flap 17b to emerge. In the high lift position, the combination would be similar to that shown in FIGURE 1.

It can be seen by inspection of FIGURE 1 that the addition of retractable surface 11 would penalize the volume storage capacity of wing 10 unless the surface 11 itself were made to carry fuel, or any installation or equipment. The structure of FIGURE 1a however, would not only increase the lift, but also the volume storage capacity. With reference to FIGURE 2 I show an external fuel tank 22 mounted on the wing tip of wing 20. Also shown are full span wing flaps 21, optional fuel tank trailing edge flap 25, and conventional leading edge slot 24, at the tip of the fuel tank. This slot permits the use of a thin airfoil section, with high lift values at the outboard extremity of the tank. This thin section is desirable only at the tip to reduce form drag of the retracted tip tank. Preferably the fuel tank should be retracted in position 23 with part of its skin surface superposed with the wing's surface. The tank extends by pivotal action about hinge line 26, to high lift position 22 for slow speed flight, wherein by the proper selection of fuel tank cross-section as an efficient high lift airfoil section, such as suggested in an alternate embodiments shown in FIGURE 2a and in FIGURE 3, described later, substantial contributions to lift and control can be made. Observe that dash lines 27 show an ingenious method of shaping the tank airfoil nose such as to permit a continuity of tank nose—wing tip leading edge surfaces for partially retracted positions of the tank as well as for the extended and retracted positions. This is accomplished by shaping that part of the fuel tank that is shown inside the wing as dotted lines 27 to have its sectional shape—in any plane—passing through axis 26—equal to the shape of the airfoil section ahead of axis 26 in the wing tip chord plane, but of slightly smaller dimensions to permit its entrance into the wing.

By inspection of the similarities of surfaces 11, 19a and 22 in FIGURES 1, 1a and 2 respectively, it is seen that the primary aerodynamic advantages of FIGURES 1 and 1a are also applicable to FIGURE 2. The structure of FIGURE 2 however, offers an additional volume for fuel or equipment storage when compared to the structure of FIGURE 1, because for equal wing areas the total volume of the combination of wing volume plus the volume of fuel tank is greater than the volume of the wing alone. It also allows convenient sweep forward or backward of tank relative to wing. In contrast to present use of external fuel tanks which only offer an increase of fuel capacity for a given drag penalty, the structure of FIGURE 2 increases the fuel capacity with a substantial improvement of lift capabilities. If desired part or all of the lift gains due to the extended lifting fuel tank may be used to decrease the wing area for a specified landing speed. If the latter case is selected, a decrease in drag of the wing—external tank combination can be produced by decreasing the wing area as shown in calculations with reference to FIGURE 1a.

In selecting the over-all shape of lifting fuel tank, the following requirements are considered and satisfied: low drag at high speed, high lift at low speed, sufficient volume storage for fuel or equipment storage, and efficient structure. Therefore, the over-all shape should be preferably as indicated in FIGURES 2a, 3 and 3b.

FIGURE 2a shows an alternate form of the structure of FIGURE 2, having an inboard lifting tip tank cross-section of the form of a thick airfoil with a double slotted high lift flap, and large volume capacity. The double slot flap may be of conventional type in which the flap elements translate as well as rotate to a high lift position. For instance, see flaps described in NACA TR 723 for NACA 23030 airfoil. Preferably, the flap elements should have no translation, but only rotation, as shown in the drawing wherein flap elements 23a and 24a rotate about fixed spanwise axes 25a and 26a respectively. These flap axes are located in close vicinity to the lower surface of the flap element and approximately below the lip of the body, ahead of the element in question. The lack of translation of the flap system for the high lift tanks is made possible due to the fact that, for the high speed flap retracted position, the flap elements need not form a continuous surface with the wing supporting them, as is usually the case, but may be placed approximately as shown in the drawing with large surface discontinuities in the lower portion of the tip tank cross section.

It should be observed that in the high speed position of the tank, with its long dimension aligned with the local flow (for instance, see position 23 of FIGURE 2a), the flap discontinuities are also aligned with the flow to produce little or no effect in drag. Additionally, the "trailing edge" portion of the lift-tank airfoil section preferably should be immersed within the wing surfaces whereby the flap discontinuities will no longer be exposed to the flow.

Continuing the specification of FIGURE 2a, volume 23a and 24a may house flap actuating mechanisms. Dotted lines 21a show the relative position of a wing tip airfoil section of the wing supporting the lifting fuel tank when the latter is extended. As shown in FIGURE 2a, fuel tank torsional loads and some bending would be carried by the skin, and some torsion shear and some bending by the spar 26a. Tip tank is hinged by a generally vertical axis 27a which simplifies the structural attachment between the wing tip structure and the tip tank structure by the relative location of the spar, near the maximum height of the wing.

To express the relation between the lifting fuel tank's contribution to lift when it is full with fuel, as in the take-off condition, I write the following expressions, assuming that the tip tank has a cross-section shaped like the NACA 23030 or similar airfoil. In terms of its chord C, the area 22a of the unflapped portion of the section can be shown to have an area of $.15C^2$ approximately. Now, the weight of fuel per foot of span can be expressed as $$\text{Volume per foot} \times \frac{\text{wt. of fuel}}{\text{unit volume}} \text{ whence } \frac{\text{wt. of fuel}}{\text{foot span}} =$$

$$.15C^2 \times 45 = 6.75C^2$$

where weight of fuel is assumed to be $$\frac{45 \text{ lb.}}{\text{ft.}^3}$$

Now the lift per foot of span is $$\frac{\text{lift}}{\text{foot span}} = C_L q C = 3.7 q C$$

with $C_L = 3.7$, $q$=dynamic pressure and $C$=chord. If we may let $n$ represent the number of times that $$\frac{\text{lift}}{\text{foot}} \text{ should exceed } \frac{\text{wt. fuel}}{\text{foot}}$$

we may write the speed at which this condition will be met in terms of the corresponding dynamic pressure $q_n$:

$$3.7 q_n C = n 6.75 C^2$$

$$q_n = n \frac{6.75 C}{3.7} = nC 1.83 \quad \quad \text{(XVII)}$$

In the above equation we may assign values of $n$ and $C$ for a given aircraft and find $q_n$ or conversely, assign $n$ and $q_n$ and thus solve for C. As an example, assume that lifting fuel tanks installed on a deflected slipstream liason STOL airplane are required to lift in take-off at least twice the weight of the auxiliary fuel carried in the lifting tanks, in order to increase range and improve effective airplane lift. Let lifting fuel tank have chord of 2'. Then, from Equation XVII:

$$q_n = 2 \times 1.83 \times 2 = 7.32 \frac{\text{lb.}}{\text{ft.}^2}$$

with a corresponding airspeed of only 78 feet per second, approximately.

If we set $n=4$, then $q_n=4=14.64$ with a corresponding airspeed of 110 feet per second, approximately.

If we assume a fuel tank of an aspect ratio of 8, we may express its total volume, taking into account its own nose, tip and fairings, and consequent decrease in volume approximately as follows:

$$\text{Volume} = 6 \times (\text{cross area of section})$$

Hence the weight of fuel that could be carried by our assumed 2' chord lifting fuel tank would be, for one tank only:

$$\text{Total weight of fuel} = \frac{\text{wt of fuel}}{\text{ft.}^3} \times \text{total ft.}^3$$

$$= 45 \times .15(4) \times 6$$

$$= 45 \times 3.6$$

$$= 162 \text{ lb.}$$

(Note: cross area$=.15C^2$ wt. of fuel$=45$ lb. $C=2'$)

This increment is of the order of the weight of the pilot for the assumed example. Thus, single tip tanks of the type assumed, one at each tip, would add 324 lb. of fuel to increase range with the introduction of a net lift of the order of twice or more of the fuel's weight. depending upon the minimum speed used for take-off and landing.

This net lift decreases the stalling speed and the take-off speed, and thus it improves the take-off maneuver.

In the landing condition, the lift contributed by the lifting tanks at a given speed, assuming the fuel tanks to be empty, would be increased further. Thus it is seen that significant contributions for the performance of the airplane can be made by the lifting fuel tanks, especially if it is realized that for the assumed liason airplane, its total gross weight may be assumed to be of the order of 4,000 lb. Similar performance gains may be made to the light twin engine commercial and military airplanes. It is seen then, that my lifting fuel tanks can improve lift substantially, in contradistinction to present use of tip fuel tanks that only add drag to airplanes.

FIGURE 2b shows a structure similar to that of FIGURE 2, except that more freedom is allowed in the shape of the nose of the lifting fuel tank, and in the location of the axis for pivotal retraction. Yet, very low drag in high speed is obtained by proper selection of the nose shape of the tank, and by retracting part of it to share its skin area with the wing skin area, thereby reducing the exposed skin area of the combination to a value lower than the sum of the skin surfaces of each of the elements. Specifically, there is shown a wing 21b with a main wing spar 22b at the tip end of which is secured a lifting fuel tank 23b. Tank 23b has a main spar 26b, the inboard end of which is connected by means of a generally vertical pivotal hinge 24b (out of paper) to the tip of wing spar 22b. Part of the fuel tank projects into wing ahead of spar, and is shown by dotted lines 25b. This part is shaped to conform to the forward tip section of a standard wing tip; for instance, in the case of a symmetrical wing-tip airfoil section, one half of a body of revolution generated by revolving that part of the wing tip airfoil section which falls ahead of spar 22b. Thus, in the retracted position shown in dash-dot lines 26b, tip tank forms a smooth fairing to the wing tip. Observe that hinge axis 24b is placed at about one third of the chord of the tip fuel tank, not only for structural reasons, but to provide in the retracted position a superposition of skin areas to reduce drag. Here about half of the tip tank skin area is effectively inside the wing area. One additional reason for the over-all chordwise location of the fuel tank in this fore-and-aft location of the resultant aerodynamic lift force on the extended lifting fuel tank at approximately the same fore-and-aft location of the aircraft's center of gravity. The exact location can be easily adjusted by varying the relative sweep between the fuel tank and the wing. The advantage of this arrangement is that the lift forces on the fuel tanks have negligible effect on the pitch stability, as will be explained later.

The calculations made with reference to FIGURES 2 and 2a have assumed that no boundary layer control, or BLC, is used on tip tanks and tip surfaces. Obviously the use of BLC on the fuel tanks, such as blowing, suction, rotation or combination, would increase the lift of the retractable lifting fuel tanks, as can be observed from my earlier aforementioned patent applications.

Some additional characteristics that may be controlled by means of the type of structure shown in FIGURES 2, 2a and 2b are the relations of variable geometry, center of gravity position and pitching moments. For instance, for the take-off condition, in an aircraft of the type assumed in reference to FIGURE 2a, the value of $n$, the ratio of lift force to fuel weight, together with the location of the lifting fuel tank in reference to the aircraft's center of gravity, may be adapted by varying the sweep of the tank to obtain a desired value of pitching moment, for instance small pitch up to counteract the relatively small negative pitch from the small wing flap deflection normally used in this maneuver.

For landing condition, the positive pitching contribution of the lifting tanks may be increased by increasing the forward relative sweep of the tank since the increased flap deflections for the landing condition would also increase the wing's negative pitching moments due to flap. Therefore the pitch characteristics and control requirements would be similar in both maneuvers. For instance, the specific relation to make the flap pitching moment neutralized by the lifting fuel tank force, requires the location of the fuel tank forward of the axis of moments of the wing—either by sweep forward of the tank or by actual forward location. With J being the chordwise distance between resultant lift of fuel tanks and axis of moments, the relation is:

$C_m$ due to flaps $+ C_m$ due to fuel tank moments $+$ lift of fuel tank $\times J = 0$ Whence the value of J can be solved for a given structure, since the remainder of the equation can be estimated from existing published tunnel data, for instance NACA TR 824.

From inspection of FIGURES 2, 2a and 2b, it is evident that in the high lift extended position of the lifting fuel tank, there exists a substantial discontinuity of planform of the combination as well as a discontinuity of airfoil profile. This is because the cross-shape of the tank, like in FIGURE 2a, should be thick for high lift, as well as to minimize the skin area of the container for a given volume of fuel storage, in order to minimize the combination's exposed skin area in the retracted position. For these reasons, it is advantageous to have the "chord" of the lifting tank less than approximately one half of the fixed wing tip chord.

It is also desirable in some cases, one of them being a swept forward wing, to use lifting tanks in combination with fixed wings arranged to be hinged near the trailing edge of the fixed wing and swing backwards from a retracted position to a high lift extending position in the vicinity or ahead of the wing trailing edge.

In FIGURE 3, the geometric characteristics of another lifting tank are shown. At one end, corresponding to the forward end in the retracted position, the cross-section of the tip tank may be a thick airfoil such as the NACA 23030 at Section 31, tapering towards the other end to a thinner section such as the NACA 23015 at Section 32, and finally, if desired, to a streamlined fairing 33. Twist may be used to insure efficient spanwise section lift coefficient distribution in the high lift position, and fixed or variable trailing edge and leading edge devices (not shown) may be incorporated. When the container is in the slow speed position, relative flow is in the direction of arrow 38, producing high lift force 35 on the surface. When in the high speed position, the relative flow is in the direction 34, producing a minimum drag 36 at high speeds. The cross-section in a plane parallel to 34 should be preferably a low drag airfoil section such as NACA 6 low drag series. If desired, the trailing edge or leading edge of the high lift section may be a straight line. Preferably the use of boundary layer control by suction or blowing should be used in the structure of FIGURE 3.

The lifting fuel tank has been shown in a very generalized view to indicate clearly the cross-shape of the body. Two basic ways to incorporate this structure to aircraft are shown in reference to schematic hinge lines 311 and 39.

When the structure of FIGURE 3 is used with hinge line 311, it should be incorporated as a wing tip container similar, for instance, to fuel tank 27 and hinge line 26 of FIGURE 2. However, when used by means of hinge line 39, the lifting fuel tank should be hung from the aircraft by a pylon, as illustrated, and described later in connection with FIGURE 8.

With reference to FIGURES 1, 1a, 2, 2a and 2b, as well as 4, 5, 6, 7 and 8 it should be observed that the angle of incidence of lifting tip surfaces or fuel storage tanks may be set advantageously with respect to the main wing. For example, incidence of surfaces 22 and 11 in FIGURES 1 and 2 respectively, may be set independent from the angle of incidence of their associated main surfaces, to promote a desired stall pattern and sequence, and to control the aircraft roll and pitch characteristics. Two preferred methods exist which are: (1) early stall of main surfaces to be promoted by increasing its incidence and effective angle of attack, relative to that of the tip surfaces; roll control could then be provided by the unstalled auxiliary surfaces or their trailing edges, and could be maintained throughout main surface stall; (2) by setting a large incidence of auxiliary surfaces to stall first, then the aircraft would pitch down rapidly, warning the pilot, and also preventing the main surfaces from stalling; roll control would be provided in this case by control surfaces in the main airfoil. These advantages are tremendous for the safety of the aircraft using this system.

Another very effective application of a retractable tip surface—tip fuel tank combination is shown in FIGURE 3a. In this case the invention is exemplified in a supersonic fighter type aircraft, improved to operate out of shortened ground distance. The aircraft has a main power plant installed in the fuselage, and boundary layer control on its main wing (not shown) and on the auxiliary lifting surfaces as an optional feature. In this drawing the gas source for boundary layer control is the main power plant, but boundary layer control air from a separate powerplant installation in the tip tank volume would also be advantageous.

Specifically in FIGURE 3a, there is shown a fuselage portion 31a with air intakes 32a for the main power plant; the aircraft's tail is omitted from the drawing for reasons stated hereafter. To the fuselage there are connected wing 34a which may have variable incidence in the fuselage. In the left wing there is shown leading edges high lift devices illustrated as leading edge flap 35a, and in the trailing edge high lift device illustrated as a BLC flap device 36a, and aileron type high lift surface 37a, which also has boundary layer control, similar to 36a, or suction. The details of this boundary layer control device are omitted, as they are well-known in the state of the art. To the tip of wing 34a there is attached a high lift device consisting of a tip-tank-tip surface combination, the general planform of which appears in this figure in two distinct embodiments, one on each wing tip. Either one type or the other may be used in an aircraft, or both may be incorporated into a single aircraft, for special advantages shown later.

I will first describe the use of each type of structure shown, used in both tips of a single aircraft. On the left wing tip there is shown a structure consisting of the lower half of tip fuel tank 38a, having a generally semi-circular or semi-elliptic cross-section (not shown in the drawing) and connected to the wing tip in a fixed position, with its long dimension generally parallel to the direction of flight, and with its center of gravity 3931a generally in the same chordwise location as aircraft C.G. 394a. The upper half of most of the length of the tip tank consists of a high lift lifting surface, having a high lift cross-section similar to that shown in FIGURE 3 and which in itself may carry fuel, and can pivot with respect to the lower fixed half about a generally vertical axis 393a (out of paper), near the nose of the fixed fuel tank, from an aligned high speed retracted position forming the upper streamlined complement of the fixed lower part (not shown) to an open high lift position 391a. The angle 392a between the retracted and extended position may be varied from retracted position at supersonic speeds to about 45° for the upper subsonic speed range, and to about 90° for the low subsonic speed range. During the landing and take-off operation, angle 392a should be determined to introduce a maximum lift force with a minimum over-all airplane pitch variation, as explained generally in reference to the calculations of lift increments and pitching moment changes due to lift increments, made in description of FIGURE 1a, and in reference to pitch stability requirements, described later. In certain cases in which there are large negative pitching moments due to high lift devices 36a and 37a, angle 392a should be made of the order of 90° for a large chordwise distance between the tank lift vector 3931a and the C.G. 394a. The arrangement on the left side of FIGURE 3a should also be used, preferably on swept back aircraft, including subsonic jet transports, in which case the lift increment of the auxiliary surfaces acts in chordwise location close to, or ahead of, the aircraft's center of gravity. The right wing tip in FIGURE 3a shows a structure similar to the one at the left wing tip, except that for reasons which include pitch changes due to the lift on auxiliary lift surfaces explained later, the auxiliary surface shown as 394a, placed extended in a rearward location and pivoted near the rear end of fixed tank 395a about an axis 398a. The rearward location is advantageous for pitch stability, as it places the lift force on the auxiliary surfaces to the rear of the aircraft's C.G. to produce a stable tail-like effect. Lifting surface 394a is displaced from a retracted position aligned and in top of 395a (not shown), backward through an angle like 397a, preferably less than 90° if it is desired to minimize the stable but negative pitch contribution of its lifting force.

I will now describe the use of both structures in an unsymmetrical arrangement on a single aircraft. As shown in FIGURE 3a, a single aircraft utilizes both of the wing tip structures. The particular advantage of this system is that the variation of position of lifting fuel tanks 391a and 394a does not contribute any significant variation in the pitching moment of the aircraft, either due to the fuelweight or the lift forces. By proper design, as shown in the drawing, it is possible to establish in the extended position a condition in which the pitch-up contribution of the difference of the lift force and the fuel weight of the left lifting tank, shown as upward vector 3931a (out of paper) be equal and opposite to the pitch-down contribution of the difference of lift force and fuel weight of right lifting tank represented as upward vector 396a (out of paper). One preferred method is to locate substantially equal lifting vectors 3931a and 396a at substantially equal perpendicular distances from the center line of the aircraft such that a straight line connecting them passes through the C.G. 394a of the aircraft. Evidently the pitch contributions are opposite and equal, whereas the lift contribution includes the sum of the upward forces of each. During the retraction process, angles 392a and 397a can be varied at a rate to maintain equal pitch contribution due to lift forces of lifting tanks 391a and 394a. One preferred method is to vary the angles such as to keep a straight line connecting the force vectors 396a and 3931a passing through C.G. 394a during the retraction changes of angles 397a and 392a.

Although I have referred to lift surfaces 394a and 393a as lifting tanks it should be understood that their volume may be used to house other installations instead of fuel, such as radio equipment, retraction installation or armament, or as means for boundary layer air passages, or even empty. The stalling characteristics of the airplane utilizing any of the structures described in FIGURE 3a may be chosen by the designer by means of relative incidence chosen between main and auxiliary lifting surfaces. Two preferred modes exist: in the first the main surfaces 34a are made to stall before the auxiliary surfaces, by prescribing that the stall angle of attack of the main wings be smaller than that of the auxiliary surfaces, to produce this effect. In this arrangement, obtained by relative incidence setting of the surfaces, roll control is provided by the unstalled lifting auxiliary surfaces, either by changes in their angle of attack or by auxiliary surface trailing edge flaps such as 3932a. A very high or very low tail location will be used in this arrangement to prevent interference of stalled flow of main wing on tail pitch control. With this stall sequence the exclusive use on both sides of the airplane of the structure shown on right wing tip of FIGURE 3a, will promote rapid pitch down with main surface stall. The proportion of lift carried in the slow speed condition by the auxiliary surface should be great, preferably greater than 30% of the airplane, and the entire trailing edge of the main surface should be equipped with very powerful high lift devices.

The second preferred mode of stall has the auxiliary surfaces stall first by having their angle of incidence set such as to have their stall angle of attack less than the stall angle of attack of the wings. Roll control should be provided in the wing by roll control surfaces such as 37a, at least after stall of auxiliary surfaces. Location of tail would be less dependent upon stall characteristics. With the structure of left wing of FIGURE 3a, stall of the auxiliary surface would produce a rapid negative pitch change that would warn the pilot of the condition encountered, tend to prevent the stall of the main wing, and warn the pilot of impending conditions. For maximum over-all lift, both main and auxiliary surfaces should stall nearly simultaneously. It should be remarked with reference to FIGURE 3a, as well as some other similar figures, that the use of boundary layer control either on the main wings or in the auxiliary surfaces does not require the aerodynamic lifting surface without boundary layer control to operate beyond its normal stall angle, hence boundary layer control failure, either in the main or in the auxiliary surface, would not destroy the entire lift of the aircraft, as is usually the case with aircraft using only main wings with B.L.C. and operating at angles of attack which are larger than the maximum stall angle in the absence of B.L.C.

FIGURE 3b shows a cross-section view of lifting surfaces fuel tank combination typical of the one shown on left wing tip of FIGURE 3a, as viewed from the rear of the tank, in the fully retracted position. The details of the hinge line locations are also applicable to subsequent figures. There is shown the end portion of a wing tip 31b supporting a fixed lower part of lifting tank 32b and a retracted upper lifting fuel tank 33b, forming a streamlined upper complement of the lower part. The cross-section of the upper part is shown as a very high lift airfoil section, preferably of 30% chord thickness, having a large leading edge radius, preferably greater than 5% chord, and with boundary layer control installation shown as gas duct 34b and blowing slot 35b. The rest of the container may be used as fuel container or for armament, installations, etc.

I will now prescribe the hinge line location between the components of the combination. Wing 31b is shown with negative dihedral with respect to horizontal line 36b by an angle 37b of about 5°. The negative dihedral with unswept wings is an undesirable feature in landing, since yawing will produce rolling opposite to that produced by positive dihedral. To overcome this adverse tendency, auxiliary surface 33b is made to have in the extended position (not shown) a positive dihedral such as to produce at least no roll due to yaw, but preferably roll in the direction of the yaw. This can easily be obtained by setting the pivotal hinge axis 311b which serves for extension of surface 33b, and is assumed for this figure to be located at the forward end of the fixed portion 32b, tilted from the vertical 38b by an angle equal in magnitude to the desired dihedral angle. Preferably angle 39b should be of the same order as angle 37b. The incidence angle of the auxiliary surface may be set in the extended position by tilting hinge axis 311b in a fore-and-aft plane passing through line 311b (plane perpendicular to the paper). To set positive incidence in the extended position, hinge axis as would be seen in a conventional side view of the aircraft, would have to be tilted backwards (out of paper in the plane perpendicular to paper in this figure). To provide roll control mentioned in description of FIGURE 3a, there is provided a spoiler lip 312b in the upper surface of the lifting surface 33b to decrease its lifting force in the extended position, or to provide a duct for high lift distributed suction, and thereby introducing rolling couples without introducing actual downward forces. Normal type trailing edge ailerons could be provided, but these are not shown in the drawing.

It should be observed that the choice of shapes and the method of extension and retraction shown in FIGURE 3b is very ingenious, as no doors or moving parts are required to provide a smooth low drag contour of the lifting fuel tank installation in the retracted or in the extended position. The upper surface of the overall envelope is that of the airfoil shape already described. The lower surface is composed of two curves approximately as follows: on the lower left quadrant a portion of an ellipse with its major axis at the vertical line 38b and a ratio of minor axis to major axis of about 0.7; on the lower right quadrant an ellipse with its minor axis at the vertical line 38b and with a ratio of minor axis to major axis of about 0.7. A low drag local cross-section is provided at the wing tip junction with the fuel tank. On the left side of the combination, the fixed part 32b of fuel tank and the retracted portion 33b should meet approximately as shown on the drawing, with the left corner of part 32b in contact with the lowest point of the leading edge radius of surface 33b.

To show the effect of these types of lifting fuel tanks on an aircraft, we calculate how much lift could be carried by the lifting fuel tank at a prescribed landing speed of 120 m.p.h. The preferable characteristics and dimensions for an STOL fighter type aircraft chosen as an example are:

| | |
|---|---|
| Gross weight | 15,000 lb. |
| Lifting tip fuel tank length | 9 ft. |
| Lifting tip fuel tank chord | 1.3 ft. |
| Lifting tip fuel tank surface | 11.7 ft.² |
| Lifting tip fuel tank lift coefficient with boundary layer control $C_L=$ | 6. |
| Lift per tank | $C_L\, qS$ with $q=$dynamic pressure and $S=$lifting surface. |

We thus have the lift per two tanks at 120 m.p.h. with $$q = 36.9 \frac{\text{lb.}}{\text{ft.}^2} = 5180 \text{ lb.}$$

It is seen that for the assumed STOL fighter, a significant proportion of its weight—about 30%—can be supported by its auxiliary surfaces as described.

FIGURE 3c shows two different structures of retractable lifting surfaces associated in this illustration with tip mounted nacelles which may house powerplants or fuel. The right hand side of FIGURE 3c shows a fuselage 31c to which is attached a supersonic type rectangular wing 32c of thin section of about 5% thickness (not shown) which in turn supports a powerplant 33c, generally aligned with direction of flight. An aircraft center of gravity 34c is shown in the fuselage. On top of powerplant nacelle 33c there are mounted two auxiliary lifting surfaces, which in the retracted position, one behind the other and with their long dimension aligned with the powerplant, form part of the upper surface of the nacelle. The cross-section which is not shown, would be similar to upper half of FIGURE 1b. In the extended high lift position the surfaces are shown as forward lifting surface 35c pivoted about a vertical hinge axis (out of paper) 36c located at the forward end of nacelle 33c, and rear lifting surface 37c, pivoted about a vertical hinge axis 38c (out of paper) located at the rear end of nacelle 33c. The length of each of the auxiliary lifting surfaces is slightly less than one half of the length powerplant 33c. It is evident that since the lifting forces on the auxiliary surfaces are arranged to pass at equal chordwise distance from the center of gravity of the aircraft, one ahead of it shown as vector 39c (out of paper) and one behind it shown as vector 391c (out of paper); the aircraft's pitching moment changes due to lift forces on the surfaces are negligible. It should be noted, however, that prescribed pitching moments may be introduced by relative changes of lifting forces by changing their relative areas and/or their chordwise moment arm to the C.G. Preferably, if the wing carries powerful trailing edge flaps (not shown), the forward surface lift force should provide a greater pitch couple than the rear surface to counteract the negative pitching characteristics of the aforementioned flap. As shown in FIGURE 3c, during the operation of retraction of auxiliary surfaces, the variation of angles 393c and 392c should proceed at substantially equal time rates to provide no significant pitch changes during retraction.

The left hand side of FIGURE 3c shows two high aspect ratio auxiliary lifting surfaces, each of whose overall length is slightly less than the nacelle length, preferably with boundary layer control for high lift forces. The B.L.C. energy is supplied conveniently by the adjacent powerplant. Specifically there is shown in the extended position auxiliary high lift front surface 394c which for retraction pivots about vertical hinge axis 395c located at forward end of nacelle 396c, backwards into a position aligned with and below nacelle 396c (latter position not shown). Also shown is rear auxiliary surface 397c in the extended position. To retract this surface, it is pivoted about a vertical axis 398c (out of paper) located at the rear end of nacelle 396c, forward to a closed position aligned with and on top of nacelle 396c. Evidently, it can be explained by the aerodynamic similarity of hinge location and method of retraction of auxiliary surfaces of left wing structures of FIGURE 3c with the right wing structure of FIGURE 3c, so that it is also possible to have negligible or prescribed pitching moment variations due to lift forces on auxiliary surfaces. By examination of the high lift arrangements on both sides of FIGURE 3c, it is evident that neither introduces large torsional loads to the wing structure since the lift forces on the auxiliary surfaces, in their operative position, are disposed one ahead and one to the rear of the wing supporting the nacelles. This is a tremendous structural advantage.

The structure of the right side of the figure is structurally extremely simple, since the surfaces are relatively short in length; hence their hinge attachments are not subject to extreme loads. The upper surface of the high lift members 35c and 37c may form a smooth continuous streamlined fairing to nacelle 33c.

The structure of the left side of the figure has the advantage of providing a much larger lifting area and span for the auxiliary surfaces by the ingenious arrangement of locating them on different levels of the supporting element, which is in this case nacelle 396.

Some cross-sectional details and details of geometry of retraction, typical of structure of FIGURE 3c, are shown in FIGURES 3d and 3e respectively. FIGURE 3d shows a cross-sectional view from the rear of a structure typical of that on the left wing tip of FIGURE 3c. There is shown an inner powerplant cross-section 31d and outer nacelle envelope 32d supported by a wing tip portion 36d. Also shown is upper lifting surface 33d which is hinged by a vertical axis 37d to the rear of the nacelle, and lower forward lifting surface 34d, hinged by a vertical axis 38d to the forward end of the nacelle. Both auxiliary surfaces are shown with trailing edge flaps to simplify their housing adjacent to inner powerplant and also to provide roll control if desired.

Since it is customary to have large inspection panel doors for powerplants, the same panel doors may be used to form a streamlined housing of the retracted surfaces, or to allow emergence of auxiliary surfaces from the nacelle. In FIGURE 3d, one such arrangement is shown in connection with the lower surface 34d, using a nacelle door 35d, shown open in dotted lines. In the upper portion of the figure the retracted auxiliary surface itself serves as part of the exterior surface of the nacelle as is shown by surface 33d which forms a continuation of 32d and part of 31d. In the extended position of 33d there would remain exposed the outboard upper half of the powerplant installation, which is located away from the path of any debris or flying objects which may be caused by the landing or take-off maneuvers. The determination of hinge line geometry between nacelle and auxiliary surfaces and their effect on incidence and dihedral angle mentioned in reference to FIGURES 3a and 3b, are equally applicable to FIGURES 3c and 3d, since the geometric configuration is in that respect analogous.

FIGURE 3e shows in planview a detail of geometric compatibility of retraction between a powerplant nacelle 31e and auxiliary surface 32e, shown in dash lines in the open position. It is seen that the location of the hinge axis between the two components should fall to the outboard side of the centerline of the nacelle by an amount approximately equal to ⅙ of the width of the nacelle. This location is advantageous to prevent the auxiliary surfaces from protruding inboard of the nacelle.

FIGURE 3f shows a peculiar method to use variable wing area and variable sweep for a delta wing aircraft to obtain substantially no disturbance in pitch due to high lift surfaces and to limit the main lift loading of the articulations supporting the auxiliary surfaces to subsonic speeds only. The geometrical position of the auxiliary surfaces during extension, retraction and in the fully extended position is similar to the third embodiment described in connection with a rectangular wing of FIGURE 3a. Specifically, there is shown a delta wing aircraft or missile 31f having a center of gravity 32f and supporting in the extended position at least two geometrically different auxiliary lifting surfaces unsymmetrically disposed with respect to the aircraft. On the left side of the delta there is shown forwardly located auxiliary surface 34f pivoted to the delta at axis 311f (out of paper) and having a net resultant lift force 35f. At the right side of the delta there is shown a rearwardly located auxiliary surface 33f supported by the delta at axis 312f and having a net resultant lift at 36f approximately equal to the net resultant lift 35f of left surface. Preferably each resultant lift should be located at approximately equal spanwise distances from the delta's centerline. The span of the surfaces need not be equal. Preferably, the right side surface should have a shorter span and larger chord. In the extended position, as shown in the drawing, the auxiliary surfaces are located equidistant in a fore-and-aft direction, from the center of gravity of the delta. This is additionally illustrated for this particular instance by the fact that a straight line can be passed connecting the substantially equal lift vectors which are equidistant to the aircraft's centerline, and the center of gravity. Evidently the pitch up contribution of aforesaid surface 34f is equal and opposite to the pitch down contribution of surface 33f, and the equal lift contributions is equal to the sum of the lifts of each surface. During retraction of auxiliary surfaces, change of position of surfaces along retraction paths 313 and 314 should have synchronized rates such as to provide opposite pitching contributions of the same magnitude from the auxiliary surfaces during their motion, whereby substantially no pitch disturbance is present in that operation. In the retracted position, surfaces 34f and 33f fall into delta recessions 37f and 38f respectively. One advantage of the structure of FIGURE 3f is that it permits the use of only two high lift surfaces pivotally supported to the delta structure (as distinct to telescopically mounted) and which can be retracted to the thickest portion of the delta without introducing serious pitching complications due to lift on auxiliary surfaces.

The auxiliary surfaces in the extended position may be required to provide uncoupled roll and pitch control. For that purpose a method is outlined, which is also applicable to the third embodiment of FIGURE 3c, and in which trailing edge portions of the auxiliary surfaces are provided with trailing edge devices 315, 316, 317 and 318, each of which can provide substantially equal control forces. To show the operation of these surfaces the following examples are shown:

To roll to the left with no pitch change surfaces 318 is deflected down and 316 is deflected down whereby the airplane has a net rolling couple, since 318 has a larger moment arm than 316, and a lift increment from flap deflection to counteract loss of vertical lift due to bank. Since the increment of lift forces due to control surfaces are equal, no pitch change occurs because the increments occur at equal fore-and-aft distances from the center of gravity.

In the next example, it is desired to roll to the left with no lift increment. In this case surfaces 316f and 318f should be deflected down and surfaces 315f and 317f should be deflected up. Each surface should provide force changes of the same order. Evidently the inboard pair of surfaces produce a rolling couple to the right, but the outboard surfaces produce a larger rolling couple to the left because their moment arm is larger. Therefore the delta rolls to the left. Further, since the lift increments cancel each other, there is no lift increment. To produce pitch changes for the delta with no rolling effects is also possible as exemplified by the following procedure to obtain nose up pitch change. Surface 316f is deflected full down and surface 317 is deflected full up. This produces a strong pitch up and a rolling moment to the right. In order to cancel the rolling moment component, an equal and opposite rolling moment to the left is introduced by deflecting surfaces 315f up and surface 318f down. These deflections, in addition to neutralizing the rolling couple to the right, also tend to neutralize the intended pitchup of inboard surfaces. It should be observed however, that since the moment arm of the inboard rolling couple is smaller than the outboard rolling couple, for equal rolling moments the forces developed by the outboard couple are smaller than the inboard forces. The forces developed by the outboard couple are smaller than the inboard forces. Therefore, the pitching moments due to the inboard pair of surfaces and outboard pair of surfaces, both of which are produced through couples with equal moment arms, cannot be in equilibrium since the outboard forces are smaller than the inboard forces. Therefore the pitching couple due to the larger forces in inboard surfaces 316f and 137f is stronger and the delta pitches up as intended.

Surfaces 315f, 316f, 317f and 318f may be standard type trailing edge ailerons or droop ailerons. Surfaces 34f and 33f should contribute substantially to the overall lift of the delta, and should preferably be used to house fuel containers, in which case fuel consumption will not alter the center of gravity location of the delta. Additionally, surfaces 34f should preferably have boundary layer control, or at least a high lift flap.

The structure shown in FIGURE 3g represents a very advantageous new use of variable geometry for a supersonic delta, and especially for a supersonic transport. It allows relatively low loading for each of the auxiliary lifting surfaces, and also allows excellent pitch and roll stability and control characteristics in the low speed condition, as well as a wide C.G. range and favorable powerplant location. The auxiliary surfaces should preferably be of a high lift section with boundary layer control by blowing. In the figure, there is shown a delta wing aircraft, missile or re-entry vehicle having powerplant groups in fin-like disposition at the rear extremes of the delta. The powerplants may be jet engines, disposed one-on-top-of-the-other with room between them to allow housing of the auxiliary high lift surfaces in the retracted high speed position. In that position, the long dimension of the auxiliary surface is parallel to the longitudinal and generally horizontal axis of jet engines. Preferably for large supersonic aircraft of the transport category and the like, or for extremely fast supersonic aircraft capable of operating beyond mach 2, the fin-like structures at the rear extremities of the delta should house a combination of pure jet engines, ram jets, and retracted auxiliary lifting surfaces. One such structure is described later in FIGURE 3h.

Specifically, there is shown in FIGURE 3g an isometric view of a delta shape structure 31g having powerplant groups 33g arranged in relatively thick fin-like structures at its rear extremities. Connected to the forward end of each powerplant group, by means of generally vertical pivotal axis 34g, there is shown in the extended high lift position a multiplane of retractable high lift surfaces 35g, 36g and 37g, mounted at different elevations in the fin-like engine group. Also shown in the high lift extended position are forward high lift surfaces 38g connected to the forward portion of the delta by generally vertical pivotal hinges 39g. Pitch control is provided by varying the vertical forces on the front surfaces and/or the rear surfaces. Roll control should preferably be provided by rear surfaces. Yaw control may be provided by the fin-like powerplant group for high speed flight, and by jet thrust deflectors at the exhaust of the propulsion engines in low speed flight (not shown). Surfaces 35g, 36g and 37g retract into powerplant group for high speed flight by backward angular displacement about hinge 34g to a fully enclosed position similar in cross-section to auxiliary surface positions shown in FIGURE 1b. The angle of retraction from the fully extended position shown to the fully retracted position should not be varied abruptly, but should be changed such as to have a sweep angle in any partially retracted position sufficient to prevent compressability effects in the auxiliary airfoils. In this way, beneficial effects of the auxiliary surfaces are obtained throughout the subsonic speed spectrum of the delta. The same method of retraction is applicable to forward surfaces 38g, which in their retracted position 311g are at the leading edge portion of the delta and to the rear of hinges 39g. The comments on hinge line location 311b of FIGURE 3b are also applicable to hinge lines of this figure.

For aircraft operating at speeds with severe adverse thermal effects, including atmosphere re-entry vehicles, the forward high lift surfaces like 38g may preferably be rotating cylinders.

It is well-known that re-entry vehicles have localized high temperatures at their leading edges which are extremely high. In my application Serial #48,038, I described the use of rotating cylinders for high lift in delta aircraft, and also as a means to equalize temperatures and thermal stresses which would otherwise be of a very high local value. It is therefore preferable to use at the leading edge of such aircraft, rotating cylinders which could be rotated not only in the extended high lift position such as 38g for high lift, but in the retracted position 311g as well. In this fashion in the high speed condition with thermal effects, the heat received by aerodynamic heating at a given instant by a portion of the cylinder exposed to air flow can be dissipated immediately thereafter when the heated portion of the cylinder revolves past the relative airflow and into the delta structure, wherein cooling devices should preferably be provided. Such rotating cylinders may be provided along most of the leading edge of the aircraft to provide relief from aerodynamic heating. Yet when extended to a high lift position in slow speed flight, generally perpendicular to the airflow, the cylinders can provide large lift and control forces.

FIGURE 3h shows a side view of a ram jet-turbo jet auxiliary lifting surface combination arranged in fin-like structure which is similar to the powerplant group combined with auxiliary surfaces shown as 33g in connection with FIGURE 3g. Specifically in FIGURE 3h, there is shown at the rear of the structure in vertical superposition, one-on-top-of-the-other from the bottom to the top, a jet engine 31h, an auxiliary lifting surface 32h in retracted position, a ram jet chamber 33h, a jet engine 34h, an auxiliary lifting surface 35h in the retracted position, a ram jet chamber 36h, an auxiliary lifting surface 37h in the retracted position and a jet engine 38h. In the forward end of the structure there is shown unoccupied areas ahead of each of the engines wherein variable air intake geometry for the engines should be provided to allow efficient air intake flow at subsonic and supersonic speeds. There is also shown generally vertical pivotal hinge axes which serve as an independent or a joint articulation to extend each of the auxiliary lifting surfaces (out of the plane of the paper) to their high lift position. Suitable doors should be provided to allow the emergence of the lift surfaces from the structure. These doors, not shown, should be similar in operation to the lower portion of FIGURE 3d, and should also serve for inspection doors for the adjacent ram jets and turbo jets.

The structures described so far have been shown to produce significant aerodynamic gains in the high and low speed regions, and significant aerodynamic gains combined with an increase in range safety and in the volume capacity of the aircraft. Such structures also decrease the loads per articulation, since the variable geometry supported by the articulations carries full loads principally in the low speed condition where the acceleration and gust effects are smaller, and by increasing the number of surfaces supporting the increased low speed lift forces by the use of ingenious multiplane arrangements.

FIGURE 5 shows a peculiar combination of aircraft components—powerplants, auxiliary fuel tanks and high lift devices—designed to increase the volume capacity and/or improve aerodynamic characteristics of the aircraft. For comparison, FIGURE 4 shows a fairly recent wing-fuel tank-powerplant combination. The drag of configuration 4 has the following contributions:

(1) Drag due to engine pods 41 and 44
(2) Drag due to support bracket 42 and 43 (two surfaces per bracket)
(3) Drag due to wing 49
(4) Drag due to interference of pods and brackets (two interferences per wing panel)
(5) Drag due to interference of brackets and wings (two interferences per wing panel)

FIGURE 4 also shows fuel volumes 47, 48 and 49 divided by structural elements (not shown) necessary to support brackets 43 and 42, part span trailing edge flap 45 with two flap interruptions 411 and 412 which allow passage of powerplant exhausts in the flap deflected position, and ailerons 46. FIGURE 5 shows by contrast similar wing 591 but with a different powerplant and high lift arrangement. Powerplants are mounted in the wing tip, one on top of the other, shown as 51 and 53 in this new configuration. However the high lift devices may be: a full span flap 55 and 56, without interruptions which are adverse to high lift, and auxiliary retractable lifting surfaces 52 and 54, similar in shape and characteristics to those described in connection with the anteceding figures. Surfaces 52 and 54 retract from swept forward position shown to a position in recesses 592 and 593 in powerplants 51 and 53 respectively, for high speed flight. The angular position of retraction path 594 may vary with forward speed, for example, for efficient climb at about 90°. We could compare the lifts and pitching moments of the structures of FIGURES 4 and 5 for equal basic wing areas, or for equal lifts, wtih calculations similar to those of FIGURE 1a generally, but taking into account the presence of a wing section suitable for the intended operation; for instance, high subsonic speeds. Since we have shown this type of calculation already, we now compare the contributions of drag of configuration of FIGURE 4 with those of FIGURE 5, the comments being applicable for a half wing.

In the high speed position, the number of interferences is diminished from the four mentioned previously with respect to the configuration of FIGURE 4, to one in FIGURE 5, mainly that of the tip powerplant's nacelle with the wing proper.

The total surface area of wing appendixes is diminished by about one half, since the peripheral area of pods, each of which is wholly exposed in FIGURE 4, is partly shared in the parallel engine installation of FIGURE 5, and the pod bracket area (two sides to each bracket) of FIGURE 4 is completely eliminated in FIGURE 5.

For equal wing lifts, since the lift coefficient of the configuration of FIGURE 5 (based on its wing area but including effects of full span flaps and auxiliary lifting surfaces) is higher than that of the configuration of FIGURE 4, the wing area of the configuration of FIGURE 5 may be decreased with reference to that of FIGURE 4 for equal landing speeds, thereby decreasing wing drag of wing of FIGURE 5 at high speeds. This decrease of wing area of FIGURE 5 would also decrease wing weight, which would in turn decrease induced drag of the wing. The increase of speed due to reduced wing area would increase the range for a given powerplant-fuel volume storage.

A comparison of volume storage capacity of FIGURES 4 and 5 shows that for equal wing area, configuration of FIGURE 5 has the added volume of auxiliary lifting surfaces 52 and 54, plus the volume increment possible within the wing by the absence of structural elements which normally are used to support brackets such as 42 and 43 of FIGURE 4. It is therefore evident that substantial gains in lift, drag, range and volume storage capacity are possible by combining wing tip mounted powerplants with auxiliary lifting surfaces in a structure such as that of FIGURE 5.

The arrangement of FIGURE 5 should preferably use boundary layer control on the lifting surfaces, or use suction or rotating cylinders as suggested in my aforementioned application Serial #48,038. In this particular case, the proximity of two jet powerplants to the lifting surfaces insures safety of operation of a boundary layer control system, since both lifting surfaces should preferably be supplied with energy available from either powerplant. Additionally, no volume of wing 591 is sacrificed for boundary layer control ducts.

Another excellent combination would be "triplane" retractable lifting surface similar to FIGURE 5, but with an additional lifting surface (not shown) similar to 52 and 54 placed in its retracted position in a space between the engines (as in FIGURE 3g) and movable to an extended position parallel to surfaces 52 and 54. It is evident that as an alternative to FIGURE 5, any of the extended high lift surfaces mentioned in its connection may be pivoted at the rear of nacelle group in a manner similar to that shown on the left side of FIGURE 3g, and in FIGURE 3d.

Generally a simple retractable surface or a multiplane of retractable surfaces may be employed in connection with an airframe, or in combination with the gas turbines or ram jets and/or their mounting, whether this powerplant be suspended above or below the main wings, in the tips, near the main payload or cargo volume, in the tail, or in any other place in the aircraft. The span of the auxiliary surface need not be equal to that of the powerplant or pod. It may, for instance, be in the retracted position project behind or in front of an engine or pod. In the extended position it need not project beyond the tip of a wing only, but it may project inboard of a wing tip below or above its surface, or at its leading or trailing edge.

Some methods of retraction and extension of the lifting surfaces can be translation, rotation about one or more axis, and combination of translation and rotation. FIGURE 1 has shown an example of spanwise translation in a suitable spanwise direction. This direction could be, for instance, parallel to the spanwise structural element of the wing for structural simplicity, or swept forward with respect to the main wing—whether the wing be swept or not—to change the fore-and-aft distance between the aerodynamic center of the surface and the aircraft's C.G. It could be swept back or swept back combined with a swept forward wing. FIGURE 1a has shown rotation of auxiliary surfaces about a vertical axis at their forward end. Rotation about their rear end is shown in FIGURES 3a and 3c. A very simple and new method is shown in FIGURE 6.

Specifically there is shown in FIGURE 6 an extended high lift auxiliary tip surface mounted on the tip portion of, and projecting beyond, the tip of the wing supporting it. For retraction, the auxiliary surface pivots downwardly about a substantially chordwise axis 62 and then upwardly into wing 63 along a path which lies in a generally vertical and spanwise plane. In this structure, auxiliary surface in retracted position (not shown in the drawing of FIGURE 6) would then be inverted and the upper surface of the auxiliary surface (which would then be a lower surface) could be disposed to fit and form part of the lower surface of the wing. A wing lower surface panel door may also be provided to form the forward part of the lower surface of the wing in the high speed position, and to permit extension and retraction of the auxiliary surface. Such a panel door should preferably have the aerodynamic function of a leading edge flap shown in the open position as 65 in FIGURE 6, and should therefore be hinged to the forward end of the wing. By this arrangement, three advantages are gained in a single mechanism, namely a spanwise high lift surface, a high speed low drag door for that surface, and a high lift leading edge flap for the wing.

The structure of FIGURE 6 should be retracted for a high speed position as follows: First rotate the auxiliary surface 61 about axis 62 downwardly and up by approximately 180° whereby surface 61 falls within recession 64 of wing 63. Then close the leading edge flap 65 about its hinge at the wing's leading edge, backward about 150° whereby 65 becomes the forward lower surface of wing 62 and the high lift surface is completely submerged between 65 and the upper forward portion of the wing.

In an alternate arrangement of this structure, the pivoted surface may be placed near the thickest portion of the wing and have high speed wing doors independent of the wing's flaps. It may unfold upwards from the retracted position, through the wing's upper surface, and then downwards to its final position. In any case, the structure allows easy variation of the dihedral angle of the lifting surface, and therefore of the slow speed effective dihedral of the aircraft using such an arrangement. Roll control may be provided by trailing edge devices on the auxiliary surfaces and therefore a full span trailing edge flap may be used in the wing supporting the auxiliary surface.

Also shown in FIGURE 6 is a special type of trailing edge slotted flap. In contradistinction with the standard trailing edge flaps in which the air that flows through the slot flows from below the wing, through the flap's slot and downwardly in an arcuate path along the upper surface of the wing's flap, the flap structure shown as 66 and 67 in FIGURE 6 has the air passing through the flap slot 68 flowing from above the wing. In this structure the air that passes through the slot follows along the upper surface of flap 66. Element 67 is supported by brackets 69 and may have a fixed or variable geometric relationship with flap 66, but retracts into wing completely for high speed position. The advantages of 67 are many. It is able to increase the speed of the flow in the upper surface of the wing by a local contraction, to accomplish re-energizing and stabilzation of the boundary layer in the upper surface of the wing. It forcefully turns the wing's upper surface boundary layer air around the leading edge of flap 66 and directs it downwardly tangentially to the flap's upper surface. Additional re-energizing and mixing in slot 68 should be provided by turbulators in the slot. The turning of the main flow of air is promoted by element 67 by means of its geometric shape and location. It should also be observed that element 67 is located above the wing for flaps deflected position, acting in the flow where the effects of viscosity in the wing's boundary layer are not present. Therefore the turning of the main body of flow above the wing downwardly can be accomplished by means of a geometrical body—67—which does not have to produce this effect in the presence of a thick, low-energy-content boundary layer such as those present in the flow about standard trailing edge flaps.

It should be observed that the flap structure used to accomplish this improved flow is unique in that a single structural unit comprising main flap 66 and protruding element 67 are used to produce the wing's camber change as well as the re-energizing of the flow in the upper surface of the wing necessary for high lift, but yet this same single structural unit can retract into a low drag high speed arrangement by simple pivotal motion about the pivot axis of the main flap. This advantage can be emphasized by noting that if a high lift retractable element such as protruding element element 67 should be mounted in the wing in the vicinity of, but independent from, the flap, then additional retracting mechanism support for it would be required, which would make this hypothetical structure too cumbersome for practical application. In the arrangement shown, flap 66 itself constitutes the ultimate supporting and extending mechanism of protruding element 67, since the latter is supported by the former by a simple bracket. This bracket will be more clearly illustrated in FIGURE 6a. With reference to the entrance and emergence of element 67 from within the wing's surface, this can be arranged by two methods, depending on the degree of complexity allowable for the aircraft. In the first method, not shown in the drawing, element 67 may itself form the upper surface of the wing immediately ahead of flap 66. In this case element 67 should be pivotally supported to the bracket or flap 66 such as to permit both a smooth low drag retracted position in which the upper surface of element 67 forms a continuation between the upper surfaces of wing and flap, and a high lift position such as shown in FIGURE 6. In the second method, suitable for more complicated high speed, low drag aircraft element 67 is completely submerged within the surface of the wing in the retracted position by means of a pivoted spanwise door immediately ahead of the flap which permits its entrance and emergence. Such a door, to be more clearly illustrated in FIGURE 6a, should preferably be used in addition as spoiler type aileron ahead of the deflected flap for slow speed flight.

It is preferable that the entire system of high lift devices shown in FIGURE 6 should be articulated by simple pivotal motion of the movable parts. To illustrate these and other features, FIGURE 6a shows a representative cross-section of the structure of FIGURE 6 with all devices retracted for high speed flight. Specifically, FIGURE 6a shows auxiliary lifting surfaces 61a of about 20% thickness, in the retracted position inverted within the wing section. The axis of rotation for its retraction is shown as 62a. The wing cross-section is approximately a 9% thick high speed airfoil section 63a. Wing recession to house retracted auxiliary surface begins at 64a. Auxiliary-surface retraction door which acts in unique co-operation with the high lift of the structure as a leading edge flap (one structural element), is shown as 65a in the door-closed position. The open position can be seen in FIGURE 6. Trailing edge flap is shown fully retracted as 66a and 67a, the latter element being located below wing trailing edge door 691a. Door 691a can also act as a trailing edge spoiler. Flap element 67a is supported by flap bracket 69a. In this particular embodiment all high lift devices are pivoted. Door 65a pivots about wing leading edge axis 651a. The flap structure consisting of flap 66a and its associated bracket 69a and element 67a pivot about the flap's axis 661a. Auxiliary lifting surface 61a pivots about 62a. As explained earlier, element 67a may be made to pivot with respect to bracket 69a about axis 671a. Finally auxiliary lifting surface 61a has its own trailing edge flap 611a which pivots about 612a. The flap 611a is shown deflected, in the retracted inverted position, in a direction opposite to the high lift direction in the extended position in order to decrease the wing volume occupied by the auxiliary surface 61a.

While this novel and simple method of auxiliary surface retraction has been shown so far illustrated with reference to conventional wing planforms, it should be remarked that it is also particularly suitable for delta wing structures. This is because it offers one main aerodynamic advantage of spanwise telescopic retraction, no fore-and-aft change of location of the weight or added lift forces on the surfaces during their extension or retraction, without the disadvantage of carriages and guides or rails usually associated with telescopic retraction methods. To illustrate this novel method of retraction of auxiliary surfaces on a delta wing aircraft, there is shown such an arrangement on FIGURE 6b. Specifically there is shown a delta wing 61b supporting extended auxiliary lifting surfaces 62b and 63b which are pivotally connected to wing 61b by generally fore-and-aft pivotal hinges 64b and 65b respectively. The hinges are situated at, or very near, the leading edges of the delta, in a fore-and-aft location approximately equal to the aircraft's center of gravity location.

Auxiliary surfaces 62b and 63b are retracted for high speed flight by turning them about their pivotal supports by approximately 180 degrees into positiins 66b and 67b respectively, whereby they are moved to an aerodynamically non-interfering position within the delta structure.

Two modes of retraction exist for the surfaces and each offers advantages. In the first, the path of retraction is below the plane of the delta. In this case, since the cambered upper surface of the retracted high lift auxiliary surfaces would not match smoothly the relatively flat lower surface of the delta, either the auxiliary surfaces should have a variable camber upper surface which can be changed to smoothly match the lower surface of the delta, or special doors should be provided in the lower surface of the delta to allow the complete entrance and emergence of the auxiliary surfaces from within the delta structure. These same doors, however, should preferable be used to allow emergence and retraction of a separate landing gear (not shown) which in the retracted position should be located within the delta and above the retracted auxiliary surfaces. This mode of retraction would generally not permit the folding of the auxiliary surfaces once the aircraft is on the ground, unless the landing gear is made long enough to allow ground clearance of the retracting surfaces, but would eliminate the need of special doors to house the landing gear. In the second mode of retraction, the path of retraction of the surfaces falls in a generally vertical plane above the plane of the delta wing. In the retracted position the auxiliary surfaces lie inverted in the delta structure and therefor if the lower portion of the airfoil-shaped auxiliary surfaces is made generally flat, this same lower surface may form in the retracted position, a continuation of the generally flat upper surface of the delta wing, thereby eliminating the need of special doors to house auxiliary surfaces if desired. The second method of retraction would also be favorable for storage purposes in aircraft carriers and the like, since the auxiliary surfaces can be extended and retracted with aircraft still stationary on the ground.

Preferably, high lift surfaces 62b and 63b should have boundary layer control to obtain high lift coefficients of the order of 5 or more, and should also serve as fuel containers. Additionally they should be provided with trailing edge devices to supply roll control for the delta aircraft in the slow speed regime. Since these details have been shown in earlier uses of lifting fuel tanks, they are omitted here.

With reference to this use of auxiliary surfaces on delta wing planforms, it should be observed that telescoping auxiliary surfaces may be used instead of the ones shown in FIGURES 6b and 3f, because the delta wing has a very large cross-sectional area (in a vertical fore-and-aft plane) compared to the cross-sectional area of the auxiliary surfaces (as would also be the case in FIGURE 1 which is analogous in that respect. Hence there is room available in the delta to install tracks and carriages, and at the same time, it is not unduly difficult to provide the necessary cavity in the delta structure for the auxiliary surfaces, as would definitely be the case with the telescoping full chord auxiliary wing tip portions mounted on a normal wing without a delta planform.

In order to illustrate the aerodynamic and structural advantages of the use of auxiliary lifting tanks such as that shown in FIGURES 3f and 6b, a numerical calculation is made showing the relative sizes of the components for a prescribed distribution of overall lift. For example, it is required that the maximum lift coefficient available from a delta wing is 1.0 without excessive angles of attack, and it is required that the combination of the delta plus the auxiliary surfaces doubles the lift available from the delta wing alone. We can write that the total lift L is approximately:

$$L = C_{L_d} q S_d + C_{L_{AS}} q S_{AS} \qquad (XXX)$$

where d refers to delta wing
AS refers to auxiliary surface
S means surface
$C_L$ means lift coefficient
q is dynamic pressure With a delta having a base or span $b_d$ and a length $h_d$, we can find the required chord $C_{AS}$ for the necessary lift of the auxiliary surfaces with the aid of Equation XXX, and with the following assumptions:

$$C_{L_d} = 1.0$$

$$C_{L_{AS}} = 5.0$$

$$\frac{b_d}{2} = b_{as}, \text{ span of each auxiliary surface}$$

Since the lift of each of the elements of the combination are prescribed equal, we write:

$$C_{L_d} q S_d = C_{L_{AS}} q S_{AS} \qquad (XXXI)$$

In order to find the chord of the auxiliary surface, we substitute the prescribed and defined values to obtain the surface of the auxiliary lifting surfaces:

$$S_{AS} = \frac{C_{L_d}}{C_{L_{AS}}} S_d \qquad (XXXII)$$

Now, with $$b_{AS} = \frac{b_d}{2}$$

and for two surfaces, we write the area equation:

$$2 \left[ C_{AS} \frac{b_d}{2} \right] = \frac{1}{5} \frac{b_d h_d}{2} \qquad (XXXIII)$$

whence $$C_{AS} = \frac{h_d}{10}$$

which gives the required chord. We conclude that the chord of the auxiliary surface should be one tenth the length of the delta wing for the prescribed lift relation. In addition, we also determine a maximum thickness of the auxiliary surface having a thickness $t_{AS}$, in terms of the thickness of the delta $t_d$. Since, as a close approximation, $t_{AS_{max.}} = t_d$, we can write that the percent airfoil thickness is numerical equal to $$\frac{t_{AS_{max.}}}{C_{AS}} = \frac{t_d}{C_{AS}}$$

which for the example is $$\frac{t_d}{h_d/10}$$

Hence, if the thickness of the delta is three percent of its length, then the thickness of the auxiliary surface is 30 percent of its own chord, which allows excellent volume storage and also very high lift with or without boundary layer control. Thus, for the auxiliary surfaces, a 30 percent thick NACA high lift airfoil may be used with distributed suction by a porous upper surface, or with a spanwise blowing slot. The lower portion of such an airfoil should be used for fuel storage, and the upper portion for boundary layer control ducts. Observe that the calculations so far have made no specifications as to the aspect ratio of the auxiliary surfaces which depends on the sweep of the delta planform. A narrow delta results in low aspect ratio auxiliary surfaces. For instance, a 70 degree delta aircraft has auxiliary surfaces each with an aspect ratio of about 2.5. Evidently such a low aspect ratio panel with a 30 percent thickness chord ratio permits a very sturdy construction which would be particularly suitable to be used for fuel tanks.

However, such large thicknesses are not to be used in delta wings employing the auxiliary surfaces at high subsonic speeds such as a climb over populated areas or busy flight patterns because the adverse compressibility effects of such thick airfoils would occur at too low a speed. Hence, a more moderate thickness of the order of 20 percent or even lower should be preferable for this purpose. It is evident that it is possible to increase the number of auxiliary surufaces on the delta wing to increase the additional lift, or to decrease their size for a specified lift increment, for instance, as shown in FIGURE 3g. Evidently, these same calculations are also applicable in principle for such a structure.

Although so far the use of telescopic and foldable auxiliary lifting panels have been mentioned separately, it is particularly advantageous, in order to provide a fore-and-aft continuity of structure of the supporting delta, to have auxiliary surfaces which in the retracted position do not occupy the entire breadth of the delta; this can be obtained by having a telescopic-foldable auxiliary surface comprising an inboard portion telescopically mounted within the delta and an outboard foldable portion (foldable with respect to the inner telescopic portion) and which in the retracted position lies adjacent and below, or above, the inner telescopic portion, and in the extended position forms a spanwise continuation of the telescopic portion.

In another alternate structure, it is advantageous, in order to eliminate telescopic carriages and rails, to have both inner and outboard portions of the auxiliary surfaces of the delta foldable about generally fore-and-aft hinge lines, with the outer portion of the auxiliary surfaces fold-in 180 degrees with respect to the inner auxiliary surfaces, and the inner surfaces—supporting the folded outer portion—folding some 180 degrees with respect to the delta to an aerodynamically non-interfering position in which both the folded inner and outboard portions of the auxiliary surfaces are within the delta.

Some additional and novel uses of auxiliary lifting surfaces in co-operation with various aircraft components are shown in FIGURES 7 through 8b. In these structures the auxiliary surfaces perform functions of high lift, control, and volume storage. However, it should be observed that the high lift and control functions are due to two contributions. One is the contribution due to the lift and control forces available from, and acting on, the auxiliary surface themselves; the other is the beneficial influence of the flow field developed by the auxiliary surface on the flow field and forces of the main supporting surfaces which produce an improvement of the lift and control characteristics of the main supporting surfaces.

As preferred examples of this type of co-operation, there are shown in the following figures, auxiliary high lift surfaces installed in pods and pylons below main supporting surfaces. The beneficial co-operation of the surfaces is explained as follows:

It is well known that pod installation below swept wings have unfavorable high lift characteristics which are related to the sweep of the wings and to the viscous and induced flow phenomena due to pylons and pods. The normal solution to the problem is the use of conventional wing mounted leading edge devices such as leading edge flaps or slats. These wing mounted devices are however, the source of high speed skin drag due to spanwise surface interruptions of the wing between the retracted devices and the wing. This detrimental drag is inherent in these normal devices and requires to install a careful and expensive fitting of the moving parts in the wing.

With my high lift leading edge devices, since they are not retractable into the wing surfaces, but to the pylons or brackets, it does not require surface interruptions in the wing. The wing then, can maintain a low-drag laminar flow over a greater portion of its surface to minimize drag.

The high lift devices are retracted into a generally streamwise position in their supporting associated structures. The surface interruptions of my devices are thus of beneficial effect for drag as they allow a considerable reduction of wing skin drag with negligible increase in pylon or pod drag and yet allow high lift on the wing.

Some specific embodiments are shown in the following figures: FIGURE 7 shows wing 75 supporting the underslung pylon 72 and pod 76. On pylon 72 there is shown pivotally mounted on pivotal hinge 74 a high lift surface 71 which can extend to a position generally parallel to the wing. Hinge 74 is substantially parallel to the long dimension of pod 76, and pylon 72 has pylon recession 73 which houses surface 71 in the retracted position. In that position, the lower surface of 71 should preferably form a smooth continuation of the adjacent surfaces of pylon 73.

Evidently with auxiliary surface 71 (located ahead of wing 75) developing positive lift, the downwash due to the lift on 71—which should preferably flow below wing 75—will counteract the leading edge upwash induced by the wing on its own leading edge; thus, this interaction acts to delay a leading edge stall on the wing and enables higher wing angle of attacks. Additionally, of course, panel 71 develops its own lift which adds to the wing lift and reduces pitching moments due to wing flaps. Surface 71 may be mounted as a retractable cantilever (as shown) or may have a diagonal pivoted bracing to the pylon which also acts to retract surface 71 into recession 73. FIGURE 7a shows a different mounting arrangement of an auxiliary surface performing functions similar to those described in connection to FIGURE 7. Specifically FIGURE 7a shows wing portion 77a supporting pylon mounted pod 72a. The pod has a retractable surface 71a shown extended in a high lift position and connected to pod 72a by a generally vertical pivotal axis 73a placed towards the rear of the pod. To retract surface 71a, it swings forward about axis 73a to pod recession 74a whereain it is in a low drag disposition in relation to the pod and the pylon. Also shown in the figure is the alternate vertical hinge connection 76a (located at the forward end of the pod) to connect the auxiliary surface and the pod.

The structure described in the figure, and in other figures, makes it unnecessary to install in the wing normal leading edge high lift devices such as standard slot 75a shown here for illustrative purposes.

FIGURE 7b shows a somewhat different arrangement of an auxiliary surface mounted on a pylon and in close vicinity to the leading edge of a wing. Specifically, the figure is a side elevation showing wing 76b supporting pylon 72b and pod 77b. Also there is shown in the extended position a side elevation of auxiliary surface 71b disposed generally parallel to the leading edge of the wing such as to form spanwise flow-re-energizing slot 74b between the trailing portion of 71b and the leading edge portion of wing 76b, to re-energize the flow about the wing. The surface 71b is connected to the pylon by hinge axis 75b generally in the plane of the pylon and substantially inclined to a horizontal direction. Surface 71b retracts generally backwards and somewhat downwards about axis 75b towards the pylon surface to position shown as dash lines 73b. In this latter position, the surface should be in a low drag position, totally or partially inside the pylon's volume, or immediately adjacent to the pylon's surface.

In an alternate form of this arrangement, the auxiliary surface may be located in the extended position with no gap between the surface and the wing, wherein it would act as a leading edge flap. In this alternate arrangement, hinge axis 75b may be located in a near vertical position whereby, in the retracted position the surface would be adjacent to the pylon and with its long dimension generally horizontal.

Also shown in FIGURE 7b are pod high lift fences 78b which extend downward from the pod. The function of these fences is to diminish the adverse effects of the vertical component of the flow towards the wing in the high angle of attack conditions. This is illustrated in the figure by showing the relative airstream vector 79b at an angle of attack with reference to the wing decomposed into vector 782b parallel to fence 78b and therefore little affected by it, and vertical component 781b which would normally add to the effective angle of attack of wing 76b but which is diminished by downward fence 78b which acts to oppose its free flow upwards around the pod or nacelle.

This favorable phenomenon is also illustrated in the next similar figure which shows a high lift nacelle or pod installation. Specifically there is shown in partial front elevation wing 71c supporting nacelle or pod 72c. Normal nacelles are of circular, elliptical, or similar cross-sections (such as dash lines 73c) and therefore when these bodies have a positive angle of attack with respect to the flow, they induce an upward flow (shown as vector 75c) which adds locally to the induced flow field of the wing to promote premature stall of the wing near the nacelle. My improved nacelle cross-section has fences 74c which do prevent upward flow 75c from adding to the induced flow fields of the wing and thereby delay stall of the wing in the vicinity of the nacelle to increase lift substantially. Such fences are useful also in connection with regular piston engine installations in wings to increase the maximum lift available from them. FIGURE 8 shows a new use of external pods as auxiliary lifting surfaces. As mentioned earlier, it is well known that aircrafts use external pods to house fuel, armament, equipment, etc. In this arrangement, the pod, in addition to carrying its useful load or equipment, by virtue of its shape and orientation, provides in the slow speed condition a considerable improvement in the lift and control characteristics of the aircraft. Specifically, the figure shows wing 80 supporting a high lift pod or fuel tank 82 below the wing by means of pylon or bracket 81. Fuel tank 82 is constructed generally according to the shape of the structure shown in greater detail in FIGURE 3, and is pivotally connected to pylon 81 by means of a generally vertical hinge axis (not shown) passing through the plane of the pylon and preferably at about the middle portion of the fuel tank. This hinge is illustrated better by hinge line 39 of related FIGURE 3 in which the hinge is placed at the location of the lifting force of the tank when the tank is in the high lift position. In FIGURE 8, the lifting tank is illustrated in high-lift position with dash lines 83, wherein it has been rotated by substantially 90 degrees from the high speed position 82.

In position 83, the lifting tank contributes to the overall lift of the combination by virtue of its own lift and by its favorable effect in reducing the leading edge upwash on wing 80 as explained earlier. Additionally, the lift tank may be provided with a tank trailing edge device, or with variable tank incidence in its high lift position 83, in order to provide roll control forces for the aircraft which should then use substantially full span trailing edge flaps 84 and 85 in its wing 80 to further increase the lift of the combination. In the high speed position of the tank, the roll control function can be restored to trailing edge flap 85. It is thus seen that my improved fuel tank is not only capable—like a standard external fuel tank—of holding the desired amount of fuel by a proper tank volume selection, but by an ingenius change of its orientation and the proper shape as I have specified earlier, it can substantially improve the performance of an aircraft.

Previous computations showing the relation of lift and fuel weight per foot of span of lifting tank are also applicable to this structure. FIGURE 8a shows a structure similar to FIGURE 8, except that in the high speed position the lifting pod is disposed in combination with a fixed powerplant. Specifically, there is shown wing 80a having flap 84a and high speed aileron 85a, supporting pylon 81a and the fixed podded engine 82a below the wing. Below the pod and connected to it by a generally vertical hinge connection (connection not shown in this drawing but similar to that discussed with reference to FIGURE 8) there is shown in the high lift position a high lift tank 83a, with its long dimension generally perpendicular to the flight direction. In the retracted position (not shown in the drawing), the tank is positioned below the pod forming the lower streamlined complement of it, or is housed within its surfaces by means of doors in a manner similar to the lower portion of the structure of FIGURE 1b. The fuel tank may be used to house water or other liquids for injection into the jet powerplants for extra thrust in the takeoff maneuver, thus enabling the use of the conventional water storage tanks for regular fuel in the wings.

FIGURE 8b shows a partial front elevation of an aircraft utilizing the structures shown in FIGURES 8, 8a, and other modifications. Specifically, there is shown the central fuselage 80b having the powerplant 84b mounted on the fuselage; a landing gear fairing 86b which in addition to housing the retracted landing gear (not shown), also houses in the high speed condition an auxiliary lifting surface which is shown extended in the low speed position as 85b; and wing 81b. The wing is shown supporting a high lift structure 82b which is constructed according to the structure of FIGURE 8a, and an outboard high lift structure 83b which is constructed according to the structure of FIGURE 8.

While a small gap has been shown between the auxiliary surfaces in FIGURE 8b in order to deliniate each structure clearly in the drawing, these gaps should be made as small as possible, or zero. It should be observed that surface 83b is shown having a positive dihedral angle with respect to the fuselage. This is desirable when the designer wants to increase the effective dihedral angle for slow speed flight. If the contrary is desired, surface 83b should be installed with a negative dihedral angle or anhedral. Since the change of effective dihedral with speed also depends on flap position, sweep, and wing dihedral, then it becomes possible to vary the final effective dihedral angle for slow speed according to the dihedral or anhedral of the auxiliary surface.

FIGURES 9 and 10 are used to present a method for the calculation of drag increments in high speed condition due to retracted auxiliary surfaces for structures generally of the type shown in FIGURES 1b, 3g, 5, 7a, 3d and others. A generalized case is assumed in which the standard nacelle arrangement of FIGURE 9 is compared to the modified one of FIGURE 10. FIGURE 9 shows cross-section of one nacelle housing two jet engines one in top of the other represented as circles with radius 94. With attached flow at high speeds, the drag D will vary principally with the nacelle surface. Hence we may write, that per foot of nacelle length, the Drag varies as a function of its perimeter P.

Now the perimeter of FIG. 9 is shown by arcs 91 of circles of radius r each of length $\pi r$ and straight line segments 92 each of length 2r. Hence we now write, for the total perimeter:

$$P = 2(\pi r + 2r)$$
$$P = 10.282r$$

FIG. 10 shows a nacelle similar to that of FIG. 9 but modified to house, between nacelles or jet powerplants represented as circles of radius 107 an auxiliary lifting surface the front elevation of which is shown in the retracted position as 105. In this position the spanwise dimension of the lifting surface is parallel to long dimension of the powerplants (into the paper).

With proper aerodynamic design the drag of the nacelles at high speed with the jets exhaustion at their rear end will vary with the nacelles surface and hence, we may write again, letting M stand for modified:

$$D_M \sim P_M$$

Now the modified perimeter is equal to the unmodified perimeter plus the increment of nacelle parimeter required to house the retracted auxiliary surface. We may select a representative auxiliary chord of 2r and an airfoil thickness for volume storage and high lift of 15% chord. Then the increment of nacelle perimeter would be as shown by 106 with a total numerical value of $$2[.15(2r)] = .6r$$

The total modified perimeter would be taken $$P_M = 10.282r + .6r = 10.882r$$

We see that the percent increment of perimeter would be:

$$\frac{.6r}{10.282r} = 5.85\%$$

Since the drag of the modified nacelle also varies with the modified perimeter, then the increment of drag due to the modification of the structure would be of the same order as the increment of perimeter surface. It can be observed then that the increment of surface drag of the modified nacelle is small in relation to the total nacelle surface drag. This increment of drag would be smaller yet in reference to the overall airplane drag because the increment of nacelle surface would be negligible in reference to the total aircraft surface and aircraft drag.

It is thus shown that the structures of the type previously described does not contribute any significant amount of drag to the airplane drag. Indeed, as shown before, they may allow a reduction of overall drag by permitting a decrease of wing area and of wing skin drag.

While the auxiliary surface has been assumed of a chord equal to the jet engines' diameter and of a span equal to the nacelles length, it is obvious that the auxiliary surfaces chord may be made somewhat greater than the maximum diameter of the jet engine by permitting part of the auxiliary surface to protrude outside the nacelle, by increasing the width of the nacelle, at its center portion, or by making the surfaces' span greater than the length of the powerplant. In these cases also the change of drag would be small.

With reference to FIG. 11, I show therein an alternate form of the structures of FIGS. 2, 2a and 2b.

Specifically there is shown a central fuselage 112 having a longitudinal axis 113 and a center of gravity 114. To the fuselage there is attached a wing 111 supporting at its wing tip a lifting retractable tip fuel tank 115 shown in the retracted position. The fuel tank has a center of gravity 117 at approximately the same fore-and-aft station as that of the aircraft's center of gravity 114.

We first consider the case in which the wing 111 is considered to be a swept forward wing. In this case, the lifting fuel tank is shown pivotally connected to the wing at generally vertical (out of paper) axis 116 located in the forward end of the wing tip and at the middle or forward end of the fuel tank. As shown, by fuel tank's dash lines, part of the retracted fuel tank falls within the wing's volume, such that the retraction of the fuel tank does not result in an increment of the exposed area of the wing and the tank, but actually it is possible to decrease the area of the combination, as explained in reference to FIG. 2b. Not to increase the combined area is important in order to prevent an increase of skin drag in high speed flight. To extend lifting tank 115 into its high lift position, it is rotated in a clockwise direction about axis 116 by approximately 90 degrees. During extension, the tank moves against the relative airstream. The arrangement shown in FIG. 11 avoids the splitting of the wing trailing edge shown in FIGURE 2a.

We then consider the case in which wing 111 is a swept back wing. In this case hinge axis 116 is located at the rear portion of the wing but at the middle or forward portion of the fuel tank. During extension of the surface from the retracted position shown, it moves in a clockwise direction about axis 116 but with the surface moving with reference to the wing in the direction of the relative airstream. The comments on variation of exposed skin surface and center of gravity location made in reference to the swept forward case are the same for the swept back case.

Finally, we consider the case in which the flow is generally perpendicular to the leading or trailing edges of wing 111, i.e., the case of an unswept wing. It is advantageous for this case to disregard the fuselage in the figure. We see that the comments on the relative location of the hinge line 116 as well as the comments of the change of exposed skin area in the retracted position are still applicable whether the air flow is regarded as coming from the top of the page to the bottom, or from the bottom to the top.

In FIGURE 12 a different combination of a retractable lifting fuel tank with a wing is shown. It is characterized in requiring that the fuel tank experiences substantially two separate 90 degree rotations for it to arrive to its extended high lift position.

Specifically there is shown a wing 121 supporting at its tip portion a lifting fuel tank 122 shown in the retracted position. The tank is supported to the wing by a double articulation the axis of which is shown as 124, generally aligned with the high speed longitudinal axis of the tank, and 123, generally perpendicular to 124 and in a plane of the fuel tank normal to the lift direction of the fuel tank in the extended position. From the kinematic viewpoint, described for illustrative purposes, extension may be accomplished by first a 90° rotation of tank 122 about 123 and with respect to wing 121, and then another 90 degree rotation of tank 122 about axis 124 and with respect to wing 121, such that the tank is in a lifting position similar to, say, that shown in FIG. 2.

Naturally, it would be advantageous from the aerodynamic viewpoint, to reverse the order of rotation, for which case it would be convenient to mount the tip tank in the retracted position either slightly below or above the wing S tip surfaces; or to prescribe the motions of extension to occur substantially simultaneously.

While the mechanism for such a mode of extension as required for FIG. 12 may appear complicated, it should be observed that such mechanism are well known in the aircraft field, for instance, the retractable landing gear mechanism of the well known Curtiss P-40 fighter is precisely of this type, and was capable of withstanding the landing loads of the aircraft. Thus it is seen that a similar mechanism could be easily adapted for the structure of FIG. 12 by anyone skilled in the art.

I will now discuss the effect of the auxiliary surfaces on the pitch stability of the aircraft or missile using them, and prescribe their location according to the designer's intended effect. The extended auxiliary surfaces may be positioned such that they will increase, decrease or not vary the pitch stability, as follows:

The criteria generally accepted for pitch stability is the rate of change of pitching moment coefficient about the center of gravity, with respect to the airplane's lift coefficient. This criteria can be expressed in symbolic form as $$\frac{dC_M}{dC_L}$$

For positive stability this term should have a negative value. For the aircraft we may write the total term as composed of a term including all the aircraft's components except the auxiliary surfaces, plus a separate term for the surfaces.

$$\frac{dC_M}{dC_2}_{\text{aircraft}} = \frac{dC_M}{dC_L}_{\text{components}} + \frac{dC_M}{dC_L}_{\text{auxiliary surface}}$$

The component term can be evaluated by standard methods known to those skilled in the art. The term $$\frac{dC_M}{dC_L}_{\text{auxiliary surface}}$$

due to the presence of the extended auxiliary surfaces includes a change of pitching moment which depends on the product of the increment of lift on the surface due to change of lift coefficient (or angle of attack) of the aircraft, times the moment arm between the center of gravity and the resultant force on the auxiliary surface. This distance is measured in a fore-and aft direction from the center of gravity.

Evidently, if the distance is towards the rear of the center of gravity (as would be the case say, for surface 394 on the right hand side of FIG. 3a), then the contribution of the rearwardly located auxiliary surface to the pitching moment stability would be a negative increment of pitching moment with increasing lift coefficient, i.e., a stable contribution to the aircraft's pitch stability criteria, as is well known to those skilled in the art.

Conversely if the auxiliary surface is located ahead of the C.G.'s fore-and-aft location, then its resultant force acts ahead of the C.G. and its effect is a destabilizing effect on the airplane stability, for instance, see location of auxiliary surfaces on FIG. 1a.

Lastly, if it is desired that the extension of the auxiliary surfaces does not vary the pitch stability parameter, then the fore-and-aft location of the extended auxiliary surfaces resulting lift force should coincide with the fore-and-aft location of the center of gravity, whereby the moment arm between these locations becomes zero and the term $$\frac{dC_M}{dC_L}_{\text{auxiliary surface}}$$

also becomes zero, hence it does not affect the pitch stability parameter $$\frac{dC_M}{dC_L}_{\text{aircraft}}$$

For instance, see the actual combination shown on FIG. 3a, or generally the type of arrangement shown on FIG. 2b.

Evidently, it now becomes possible for the designer to vary the pitch stability with the regime of flight, firstly, by selecting the basic position of the extended auxiliary surface, and secondly, by making small adjustments in that selected position. Evidently, the angle 392a of FIG. 3a, or 594 of FIG. 5, and similar angles of other figures, may be varied in flight by small amounts such that the exact fore-and-aft location of the resultant force on the auxiliary surface is related or varied with respect to the actual aircraft center of gravity position. Since the aircraft center of gravity position varies with load distribution, fuel consumption, etc., within a small fixed margin of distance expressed in percent of the mean aerodynamic chord, then this small adjustment of the surface's fore-and-aft location can be related to the actual varying position of the C.G. as the fuel is consumed, etc. For instance, in the left side of FIG. 3c, a hypothetical rearward shift of center of gravity 34c from a most forward position to a most rearward position (not shown in the figure) may be of say 5% of the mean aerodynamic chord, accompanied by a rearward angular displacement of surface 394, or of surface 394 and 397 together, say of the order of 10 or 15 degrees.

The exact values of course will depend on the type of aircraft, the desired stability characteristic, etc. No general fixed rule is convenient because the individual conditions may vary. For instance, in order to increase the effective elevator power in landing to increase angle of attack, it may be desirable to decrease the pitch stability of an aircraft. Conversely, for other types of airplanes that show unstable pitch characteristics in landing, say due to propeller effects, it may be desirable to increase the pitch stability in landing.

Other advantageous use of the auxiliary surfaces for pitch stability and control have already been mentioned earlier in the applications. One use consists in setting the relative incidences between the auxiliary surfaces and the main surfaces such that the stalling angle of attack does not occur simultaneously for both main and auxiliary surfaces, but one set of surfaces stall first while the other surfaces retain lift and roll control. One of these set of surfaces—preferably the surface that stalls first—may have boundary layer control, as explained earlier, such that even a BLC failure does not result in a total loss of lift as is the case in many present BLC systems. Another advantage of a separate stalling sequence is that the stalling of one set of surfaces before the other would warn the pilot of the impending conditions and before total loss of lift occurs, and may be used to drastically change the term $$\frac{dC_M}{dC_L}_{\text{aircraft}}$$

or the curve $C_M$ or $C_L$ towards a stable condition. Evidently, early stall of surface 19a and 17a of FIG. 1a which have an unstalled positive contribution to pitch stability would result in a large negative and stable change of the stability parameter.

Another advantageous result of some of the structures shown is that the fuel consumption of the lifting tanks or auxiliary surfaces does not affect the stability conditions because the tanks' or surfaces effective C.G. can be made to have the same fore-and-aft location of the aircrafts C.G. independent of fuel consumption. Evidently, this condition is available by inspection of say FIGS. 3a and 3c, independent of tank's location, and in FIG. 8 if the projection of the tanks C.G. on the wing's plane falls very close to the effective aerodynamic axis of wing 80. The tank's C.G. should then be very close to, or coincident with, the tank's generally vertical pivotal axis of movement with respect to the pylon, and at or very near the pylon's lower end.

Such pitch stability considerations may be used to minimize the tail size in order to decrease overall drag at high speeds.

It should be observed in connection with pitch stability, tail size and auxiliary lifting devices that the use of rotating cylinder, or suction cylinders with a cylinder trailing vane, such as that of FIG. 8 of my patent application Serial #48,038, would present no complication to the pitch stability of the aircraft. In the case of the cylinder with rotation this occurs because the pitch stability criteria of the aircraft is as already mentioned, the rate of change of moment coefficient, about the airplane C–G, with respect to the lift coefficient of the aircraft or its angle of attack. Now the lift on a rotating cylinder is independent of the angle of attack of itself or the airplane, since its lift depends exclusively on the ratio of peripheral cylinder speed to cylinder's translational speed. Hence, the pitching contribution due to the lift of the cylinder times its distance to the center of gravity is a constant with angle of attack, its lift derivative with respect to angle of attack of the aircraft is zero, and it does not affect the airplane's pitch stability. In the case of a suction cylinder with a trailing vane, or a rotating cylinder with a trailing or leading vane, the pitch stability variations due to the lifting forces can be made very small. This is explained as follows: the angle of attack of such a cylinder is the angle of attack of the fixed vane with respect to the remote airstream. If the vane is set at its maximum lift position for a given aircraft angle of attack, then increasing or decreasing the angle of attack of the cylinder as a consequence of the change of angle of attack of the airplane, changes the lift coefficient of the cylinder very slightly. For instance, changing the angle of attack of a trailing vane of a suction cylinder from 60° to 70° changes the cylinder lift coefficient from 9 to 8.6 (Ref. FIG. 13, British R & M 2787). Hence, the change of pitch contribution due to the variations of cylinder lifting forces with airplane angle of attack is very small indeed, and would have little effect on the overall stability derivative. However, the actual fore-and-aft location of the cylinder with respect to the C. G. can still be used to set the value of the $C_M$ contribution of the cylinder (rather than its derivative) to the overall pitch static equilibrium, such that the pitching moments (rather than their derivatives) are very small zero or positive, as shown in connection to FIG. 1a.

I have so far discussed the effects of the auxiliary surfaces on the pitch stability of the aircraft. I will now explain some peculiar use of the auxiliary surfaces for certain special unsymmetrical flight conditions, whereby the safety and efficiency of the aircraft is greatly improved. It is well known that for multiengine aircraft the occurrence of unsymmetric powerplant failure is very critical, specially at low speeds. We first consider the case of jet-propelled aircraft. In this case two main critical cases may be yaw stability, and thrust availability for climb. Unlike propeller aircraft, roll stability per se (uncoupled from yaw effects), is not as serious due to the absence of propeller slipstream. With respect to yaw stability, the way to alleviate the unfavorable yaw effects of unsymmetrical powerplant failure is to extend the auxiliary lifting surfaces only on the side of the aircraft opposite to that in which the powerplant failure occurred. This will evidently result in a shift of the wing resultant drag force, including induced drag, in a direction away from the centerline of the aircraft and towards the location of the resultant thrust force, whereby the unfavorable yaw couple between the resultant thrust force and the wing resultant drag force is greatly reduced. This mode of operation would be very useful for structures of the type of FIG. 5, and would generally allow to reduce the size of the rudder of the aircraft considerably.

With respect to thrust available for climb, it should be observed that the extension of both surfaces is desired if the rate of climb is critical, since this will reduce induced drag by increasing the span and reducing the lift coefficient of the aircraft, whereby a greater amount of thrust remains available to do work against gravity. With reference to propeller driven aircraft two cases for unsymmetric power plant failure are considered.

In the first, it is assumed that unsymmetric powerplant produces a critical condition in yaw but not in roll. In this case, the same considerations explained in reference to the jet powerplant case are applicable.

In the second case, which is generally applicable to propeller driven aircraft in which the slipstream contributes strongly to slow-speed lift, a powerplant failure produces a critical condition in roll, i.e., the airplane will tend to roll by dropping the wing where the power failure occurred. For this case then, only the auxiliary surfaces on the side wherein the powerplant failure occurred should be in the extended condition, whereby they introduce an extra lift force which acts to minimize, cancel or reverse the unsymmetric rolling couples caused by the unsymmetric slipstream effects on the wing. Generally speaking, powerplant failure results both in a critical condition of thrust available and roll stability. A compromised solution therefore consists in extending both auxiliary surfaces to reduced induced drag, but to have different positive lifts in each whereby a large rolling couple, due to the large moment arm and equal approximately to the span multiplied by the difference of lift on the auxiliary surfaces, can be introduced to the aircraft.

I will now recapitulate on the structures described in this invention, summarizing their aerodynamic and structural charactertistics and pointing out the necessary mechanisms for their construction and operation. Prior to this summary, however, it should be observed that the substance of the invention includes the relative locations, methods of retraction, proportions, shape, and combinations with aircraft components (specially with wings and nacelles) of retractable auxiliary lifting surfaces and retractable lifting fuel tanks, such retractable members having prescribed aerodynamic characteristics to provide the desired overall improvement in lift drag, control, and structural construction, and volume storage capacity of the aircraft or missile utilizing them.

Some secondary detailed mechanical aspects have also been included in the figures and in the specifications to indicate method of construction and operation. These will be reviewed here, and additional structures and mechanisms that may be used or modified for these mechanical details of my structures will be also mentioned by way of reference to pertinent U.S. patents and other data.

In this recapitulation, I will group the alternate embodiments of the invention according to some of their common characteristics.

In FIG. 1 I have described a single telescopically mounted retractable auxiliary lifting surface having boundary layer control for high lift. The combination is characterized in having the product of the maximum section lift coefficient times the chord of the auxiliary surface 11 approximately equal to the product of the maximum section lift coefficient times the chord of the wing 10. The maximum thickness of surface 11 is approximately equal to or somewhat less than the maximum thickness of wing 10, and the chord of 11 is generally between one-half and one quarter of chord of 10. The airfoil cross-sections of 11 should be a subsonic high lift section of 12% thickness or greater and may have a trailing edge flap or aileron 13 which may be used for roll control, in which case a full span flap 12 may be used whereby this unique cooperation of aileron 13 in auxiliary surface 11 with wing 10 permits an additional increment of lift on the wing due to full span flap 12. As has been shown this is a significant increment of lift.

The mechanisms to install a telescopic auxiliary wing portion are well known in the state of the art, thus they need not be disclosed here. See, for instance, the mechanism shown in FIGS. 3, 6, and 10 of U.S. Patent 2,743,072 "Collapsible wing system for aircraft and actuating means therefor" which could be easily adapted for use in my structure of FIG. 1. The boundary layer control system could be as described in U.S. Patent 2,844,337.

One additional structural prescription to FIG. 1 is that auxiliary lifting surface should preferably be constructed to serve as an integral fuel tank, that is, the volume defined by its outer surfaces should be approximately equal or slightly greater than the volume of fuel contained within the surface. This is of importance in order to not impair the volume storage capacity of the aircraft or missile.

Referring now to the structures of FIGS. 1a, 1b, 3a, 3b, 3c, 3d, 3e, and 3g it may be observed that the auxiliary lifting surfaces and lifting tanks are incorporated at the wing tips of aircraft wings in combination with wing-tip fixedly mounted wing-tip power plants or fuel nacelles. These nacelles have their long dimension generally in the direction of flight, and the single or multiplane of auxiliary lifting surfaces are positioned such that when the surfaces are retracted they have their long dimension aligned with the longitudinal axis of the nacelles and are faired with the nacelle in smooth low drag units. When extended however the auxiliary surfaces have their long dimension generally perpendicular to the flight dimension and form an extension of the wing span and wing area, to increase lift, decrease induced drag, and improve control characteristics for slow speed flight. In these structures, it should be observed that, since the auxiliary surfaces are not retracted into the tip portion of the wing, there is no need to limit the size of the auxiliary surface to that of the wing tip portion. For instance, the maximum thickness of the auxiliary wing surface may be greater than the maximum thickness of the wing tip, as shown in FIGS. 3b and 3d. Additionally, the wing structure is not complicated nor its volume storage capacity diminished; actually additional volume is provided in the auxiliary surfaces. The location of the extended auxiliary surfaces may be prescribed as disclosed earlier in the specifications to introduce positive or negative pitching moments to the aircraft, and to increase or decrease the pitch stability characteristics of it, depending on the designer's choice. The mechanism to retract and extend the surfaces are particularly simple insofar as they are simple pivotal hinges in a generally vertical direction, which are only loaded in the slow speed regime. They may be, for instance, of the type shown as 27a in FIG. 2a but applied to a nacelle-auxiliary surface combination, or of the type shown on the right hand side of FIGURES 4 and 5 of U.S. Patent 2,410,239.

It should be observed that the embodiment shown in the aforementioned FIGURES 1a to 3g of my application are not the only possible ones but many useful variations are advantageous, for instance, in FIG. 1a the multiplane 19a and 17a could be hinged not at axis 21a but at a similar axis located at the rear end of nacelle 23a, whereby static stability is increased. Also the auxiliary surface of FIG. 5 or 3a could be used instead of group 33g of FIG. 3g. In an alternate embodiment of the delta wing of FIG. 3g, forward retractable auxiliary surfaces 38g can be replaced by a fixed or a retractable canard delta tail at the forward end of the main delta 31g, in other the powerplant-auxiliary surface group 33g may be displaced forward with respect to CG 32g.

In the case of multiplane auxiliary surfaces, boundary layer control may be used only on the uppermost member of the multiplane, yet the induced field of flow and downwash of that BLC member will substantially improve the maximum lift of the remaining members of the multiplane even though these other members may not have boundary layer control. Thus, with the BLC power required for one member, lift gains greater than those experienced on the BLC member result for the combination. Conversely, if the BLC power should fail, the loss of lift of the multiplane auxiliary surface system is not total, but a considerable lift remains from the members without BLC. Thus, it is seen that a unique and advantageous augmentation of the beneficial effects of a BLC system can be achieved by using BLC on the uppermost member of a multiplane.

With reference to the structures of the type shown in FIGURES 2, 2a, 2b, 11, I show therein a unique and novel use of fuel tanks mounted on wing tips of airplanes. In this embodiment, in the high speed retracted condition the tanks are in a conventional position. Yet, by means of the proper shape of the tank, for instance, as specified in FIG. 3, and by means of a single pivotal connection which permits the tank's rotation such that its long dimension becomes generally perpendicular to the flight direction in the slow speed condition, then a large increment of lift, improvement of control and decrement of induced drag becomes possible, as has been mentioned earlier in the application.

As shown in the figures, the chord of the lifting tank should preferably be less than one half the chord of the supporting wing, the length of the tank should preferably exceed that of the chord of the wing, and a large cross-section for the tank is shown for volume storage. As shown in FIGS. 2 and 2a, the maximum thickness of the tank should be less than that of the wing. However, in the case of FIGURE 2b for instance, the thickness or cross-section of the tank 23b with the exception of that portion of 23b which is in the extended position falls within wing 21b, may preferably be made of a maximum thickness greater than that of the maximum thickness of the wing. A front elevation of 23b would show then a change of thickness of it. In the retracted position 26b the tank may fit between the upper and lower surfaces of wing 21b (as shown say in FIG. 2) or alternately the lower surface of 21b which would be below 26b may be eliminated in which case the lower surface of 26b becomes a continuation of the lower surface of the remaining part of wing 21b.

Methods of pivoting the lifting tip tank to the wing are shown in FIG. 2a, wherein the smaller diameter portion of axis 27a is fixed to the wing, and the larger diameter portions of axis 27a are bushings concentric to the small-diameter portion and fixed to lifting tank 21a.

It should be observed that for the lifting fuel tanks the location of the hinge axis is generally in the forward portion of the wing and of the fuel tank's chord, and that the exposed skin area of the combination is not increased by virtue of the retraction of the auxiliary tank.

A method for retraction and extension is shown by means of piston and link 25b of FIGURE 2b, which moves the fuel tank 23b in and out from its retracted position 26b. A different method of hinging extending and retracting the auxiliary surface can be obtained utilizing the mechanism shown in FIGS. 3, 5, 6, 7 and 8 of U.S. patent application 2,961,196 modified to have the hinge located at the forward or leading edge portion of the wing chord and the auxiliary member chord to locate it at a structurally advantageous point and to eliminate the adverse effect of increasing the exposed area of the combination with retraction which would result from the selection of a rearward hinge axis.

With reference to FIGS. 6, 6a and 6b, wherein I describe an ingenious 180° folding system for auxiliary lifting surfaces, which acts in unique cooperation with a leading edge mechanism may be that shown in FIGS. II and III of my U.S. patent application Ser. No. 117,331 of June 15, 1961. The control of the trailing edge devices on the surface, like 62a of FIG. 6a, may be obtained according to the specifications and figures of U.S. Patent 7,712,421.

With reference to FIGS. 7, 7a, 7b, 8, 8a and 8b, it should be observed that in contradistinction to other embodiments, the auxiliary surfaces are not mounted at the wing tips necessarily but are generally below the wing and connected to the wings by means of pylons and pylons with nacelles. In the case of FIGURES 7, 7a, 7b and 8a the auxiliary surfaces are shown in ingenious combinations with powerplant groups and they act not only to produce a local aerodynamic force on their own surfaces but also modify the overall flow field to improve the aerodynamic characteristics of the main wing as explained in earlier portions of the specifications. Evidently, the mechanisms needed to operate these auxiliary surfaces are extremely simple since all are simple pivotal connection-like door hinges.

In the case of FIG. 7 surface 71 could be hinged, for instance, as shown in FIG. 1 and 2 of U.S. Patent 2,418,301 except that instead of showing a supporting wing 20 in that figure, there would be a nacelle like nacelle 76 of my FIG. 7 supporting the pivoted portion.

In the case of FIG. 7a, the mechanism referred to in connection to my FIGURES 1a, 3b and 1b could evidently be also used to operate surface 71a.

In the case of FIG. 7b, all that is needed is a simple pivotal connection at axis 75b between pylon 72b and surface 71b. Evidently, any landing mechanism—like that shown in U.S. Patent 2,754,072—may be easily adapted, or a pivot of the type mentioned in reference to FIG. 7 could also be used.

With reference to the streamwise flow fences 78b and 74c of FIGS. 7b and 7c respectively, they can be made fixed as shown on the figure, or retractable to a position in which their surface is immediately adjacent to, and smoothly faired with, the nacelle's surfaces. Such retractable surfaces can be constructed according to the mechanisms shown in reference to FIGURES 1, 2, 3 and 4 of U.S. patent application 2,448,075.

With reference to the auxiliary external rotatable lifting fuel or water tanks shown in FIGS. 8 and 8a, any turntable mechanism may be used ot mount and rotate the tank from its high speed low drag position in which its long dimension is aligned with the flow to the high lift position in which its long dimension is generally perpendicular to the flight direction. For instance, the mechanism shown on FIGS. 5 and 4 of British Patent 785,633 may be used.

Before concluding these specifications, I should like to indicate that any of the auxiliary surfaces described herein may be mounted on the supporting airframe in the manner disclosed in my patent application Serial Number 48,038 of August 8, 1960. Conversely, the lift-force and control-force cylindrical bodies described in said application may be mounted to an aircraft in any of the arrangements and combinations shown herein for my auxiliary lifting surfaces.

Various further modifications and alterations from those described hereinabove can obviously be made without departing from the spirit of this invention, and the foregoing are to be considered purely as exemplary applications thereof. The actual scope of the invention is to be indicated by reference to the appended claims. In the claims, the word nacelle is used to mean streamlined bodies mounted on an aircraft in a location external to a central fuselage. The nacelles have a long dimension substantially greater than their maximum width, and the long dimension is parallel to the high-speed direction of flight. Nacelles can house fuel tanks, propulsive or lifting powerplants, payload, armament, landing or alighting gears, other installations and auxiliary lifting surfaces.

I claim:

1. For aircraft, missiles and the like having a body portion with a longitudinal axis generally aligned with the flight direction of said body portion and a main lifting surface extending in substantial symmetry to each side of said longitudinal axis the improvement comprising: a fixed nacelle fixedly mounted on said main lifting surface and having a nacelle long dimension generally parallel to said longitudinal axis of said body portion and a nacelle planform shape and area; a retractable auxiliary lifting surface mounted on said fixed nacelle and having an auxiliary lifting surface long dimension, and a retracted surface planform shape approximately similar to the planform shape of said nacelle and retracted auxiliary surface planform area no greater than an area approximately equal to the planform area of said nacelle, and means provided to vary the position of said auxiliary surface, between a first position in which said auxiliary surface and said nacelle are substantially immediately adjacent and parallel to each other and a second position in which said long dimension of said auxiliary surface is inclined at a substantial angle to said long dimension of said nacelle.

2. The structure of claim 1 in which said main lifting surface has a pair of symmetrical tip portions, one on each side of said longitudinal axis of said body portion, with one of said nacelles with said auxiliary surface thereon being mounted on each of the tip portions of said main lifting surface.

3. The structure of claim 2 in which said auxiliary surfaces in said second position project beyond the tip portions of said main lifting surface in a direction generally perpendicular to said longitudinal axis of said body.

4. The structure of claim 3 in which said auxiliary surfaces are pivotally supported by pivotal axis generally perpendicular to said main wing surfaces, said auxiliary surfaces being constructed as lifting fuel tanks capable of housing within them a fluid volume approximately equal to the volume defined by the external surfaces of said auxiliary surfaces.

5. For aircraft missiles and the like having a body portion with longitudinal axis generally aligned with direction of flight of said body and a wing surface extending in substantial symmetry to each side of said longitudinal axis and having wing tip portions thereof with a wing tip chord and a wing tip maximum thickness, the improvement comprising auxiliary retractable lifting tanks pivotally mounted on the tip portions of said lifting surface about pivotal axes generally perpendicular to said lifting surfaces, said auxiliary lifting tanks having a structure capable of holding a fluid volume approximately equal to the volume defined by the external surfaces of said tanks and a shape characterized in having in a plane including its long dimension the cross-sectional shape of a generally symmetric low drag airfoil, and in any plane perpendicular to its long dimension a cross-sectional shape of a cambered unsymmetric high lift airfoil with a chord substantially smaller than the chord of said tip portion of said wing, and means provided to vary the position of said retractable lifting tank between a first position in which the long dimension of said tank is generally parallel to the longitudinal axis and a second position in which the long dimension of said tank is inclined at a substantial angle to said longitudinal axis.

6. The structure of claim 5 further characterized in that the maximum thickness of said lifting tank is greater than the wing tip maximum thickness of said wing.

7. The structure of claim 2 further characterized in that each of said nacelles has a multiplane of retractable auxiliary surfaces mounted thereon which in said first position have their respective planforms approximately above each other.

8. The structure of claim 7 further characterized in that the upper retractable auxiliary surface mounted on said nacelle has boundary layer control means in its upper surface.

9. For flying vehicles having a body portion with a longitudinal axis generally aligned with the direction of flight of said body portion and, having a vehicle center of gravity and a main lifting surface extending in substantial symmetry to each side of said longitudinal axis, the improvement comprising: a pair of auxiliary lifting members mounted on the edge portions of said lifting surfaces one mounted on one side of said longitudinal axis and ahead of said center of gravity axis and the other mounted on the opposite side of said longitudinal axis and to the rear of said center of gravity axis and means provided to vary the position of said auxiliary members to include a first position in which the long dimension of said members are inclined at a substantial angle to said flight direction of said body and a second position in which said long dimension of each of said members is approximately parallel to the edge portion of the main lifting surface on which said auxiliary member is mounted.

10. The structure of claim 9 further characterized in that said auxiliary members are mounted on the tip edge portions of said main lifting surfaces remote from said longitudinal axis.

11. The structure of claim 10 characterized further in that said auxiliary surfaces are mounted on wing tip nacelles of said wing.

12. The structure of claim 3 in which said auxiliary surfaces are pivotally supported by pivotal axis on said nacelles substantially perpendicular to said wing surfaces and with the axial projection of said pivotal axis passing outside the planform of said wing.

13. For an aircraft having a longitudinal body portion generally aligned with the direction of flight, auxiliary lifting surfaces mounted externally on said aircraft by means of a pylon, said auxiliary lifting surfaces having an internal volume capable of holding a fluid volume approximately equal to the volume defined by the external surfaces of said auxiliary surface, and a shape characterized in having in a plane including its long dimension the cross-sectional contour of a low drag airfoil, and in any plane perpendicular to its long dimension the cross-sectional shape of a cambered unsymmetrical high lift airfoil, and means provided to vary the orientation of said auxiliary surface between a first position aligned with said direction of flight and a second position generally perpendicular to said direction of flight.

14. An aircraft wing having a lower surface, an elongated nacelle mounted on said wing below said lower surface, and a movable auxiliary high lift surface mounted on said nacelle for movement between a retracted low drag flight position in which said high lift surface is faired with said nacelle in a combined streamlined body and an extended high lift flight position in which said high lift surface is inclined to said nacelle at a substantial angle, and is located below said wing in a plane approximately parallel to a plane of said wing.

15. A delta wing having side edge portions, a pair of auxiliary wing surfaces mounted on said side edge portions for movement about a pivotal axis parallel to said side edge between a low drag position in which said surface pair are superposed faired with said delta wing one to the rear of the other, and a high lift position in which said surface pair is inverted to a position completely outboard of said side edge portions.

16. An aircraft propelled by a jet propulsion engine and capable of operating at speeds at least as great as approximately seven-tenths the speed of sound comprising: an elongated central fuselage body having an overall length at least as great as approximately six times the maximum height of said body; a pair of high speed thin wings extending laterally from said central body; a pair of elongated nacelles mounted on said thin wings on opposite sides of said central body and approximately parallel to said central body; a pair of retractable slow speed auxiliary wings mounted on said aircraft, one contiguous to each of said nacelles, with said slow speed auxiliary wings being movable from a high speed disposition in which each of said auxiliary wings has its long dimension approximately parallel to said nacelles and is adapted to be faired to one of said nacelles, to a slow speed disposition in which each of said slow speed auxiliary wings has its long dimension inclined at a large angle to said nacelles and augments the lift available to said aircraft.

17. The structure of claim 16 further characterized in that boundary layer control means are provided on said auxiliary wings.

18. The structure of claim 16 further characterized in that one of said auxiliary wings in said slow speed disposition is oriented approximately perpendicular to said central fuselage body with one end of said one auxiliary wing protruding inboard of said nacelle.

19. The structure of claim 16 further characterized in that one of said auxiliary wings is constructed to contain a fuel volume approximately equal to the volume of the body portion of said one auxiliary wing.

20. The structure of claim 16 further characterized in that flaps are provided on said auxiliary wings.

21. The structure of claim 16 further characterized in that a second retractable slow speed auxiliary wing is mounted contiguous to each of said nacelles.

22. The structure of claim 21 further characterized in that a jet propulsion engine is mounted in each of said nacelles between said auxiliary wings.

References Cited by the Examiner

UNITED STATES PATENTS

| | | | |
|---|---|---|---|
| 2,584,961 | 2/1952 | Beck et al. | 244—43 X |
| 2,673,698 | 3/1954 | Ericksson | 244—105 |
| 2,734,701 | 2/1956 | Horton | 244—43 |
| 2,925,233 | 2/1960 | Dunn et al. | 244—43 |
| 2,929,582 | 3/1960 | Munro | 244—43 X |
| 2,961,196 | 11/1960 | Atkinson | 244—46 |
| 3,069,115 | 12/1962 | Strang | 244—43 X |
| 3,070,327 | 12/1962 | Dornier et al. | 244—100 X |
| 3,083,936 | 4/1963 | Rethorst | 244—49 |

FOREIGN PATENTS 506,528  5/1939  Great Britain.

MILTON BUCHLER, *Primary Examiner.*

ANDREW H. FARRELL, *Examiner.*